(12) United States Patent
Biggerstaff

(10) Patent No.: US 8,327,321 B2
(45) Date of Patent: Dec. 4, 2012

(54) SYNTHETIC PARTITIONING FOR IMPOSING IMPLEMENTATION DESIGN PATTERNS ONTO LOGICAL ARCHITECTURES OF COMPUTATIONS

(75) Inventor: Ted James Biggerstaff, Austin, TX (US)

(73) Assignee: Ted J. Biggerstaff, Austin, TX (US)

( * ) Notice: Subject to any disclaimer, the term of this patent is extended or adjusted under 35 U.S.C. 154(b) by 0 days.

(21) Appl. No.: 13/219,644

(22) Filed: Aug. 27, 2011

(65) Prior Publication Data

US 2011/0314448 A1 Dec. 22, 2011

Related U.S. Application Data

(63) Continuation-in-part of application No. 12/363,738, filed on Jan. 31, 2009, now Pat. No. 8,060,857.

(51) Int. Cl.
G06F 9/44 (2006.01)
G06F 9/45 (2006.01)

(52) U.S. Cl. .......................... 717/106; 717/114; 717/136

(58) Field of Classification Search ................... 717/106
See application file for complete search history.

(56) References Cited

U.S. PATENT DOCUMENTS

| | | | |
|---|---|---|---|
| 6,408,431 B1 * | 6/2002 | Heughebaert et al. | 717/106 |
| 6,684,388 B1 * | 1/2004 | Gupta et al. | 717/136 |
| 7,581,170 B2 * | 8/2009 | Baumgartner et al. | 715/234 |
| 2008/0040174 A1 * | 2/2008 | Murthy et al. | 705/7 |
| 2009/0018811 A1 * | 1/2009 | Paradkar et al. | 703/22 |

OTHER PUBLICATIONS

Neighbors, "The Draco Approach to Constructing Software from Reusable Components" 1984, IEEE Transactions on Software Engineering, vol. SE-10, No. 5, pp. 564-574.*
Bezivin et al., "Model Transformations? Transformation Models!" 2006, Springer-Verlag, Model Driven Engineering Languages and Systems (MODELS), LNCS 4199, pp. 440-453.*
Biggerstaff, "A Perspective of Generative Reuse" 1997, Microsoft, Technical Report MSR-TR-97-26.*

* cited by examiner

Primary Examiner — James D Rutten

(57) ABSTRACT

A method and a system for using synthetic partitioning constraints to impose design patterns containing desired design features (e.g., distributed logic for a threaded, multicore based computation) onto logical architectures (LA) specifying an implementation neutral computation. The LA comprises computational specifications and related logical constraints (i.e., defined by logical assertions) that specify provisional loops and provisional partitionings of those loops. The LA contains virtually no programming language constructs. Synthetic partitioning constraints add implementation specific design patterns. They define how to find frameworks with desired design features, how to reorganize the LA to accommodate the frameworks, and how to map the computational payload from the LA into the frameworks. The advantage of synthetic partitioning constraints is they allow implementation neutral computations to be transformed into custom implementations that exploit the high capability features of arbitrary execution platform architectures such as multicore, vector, GPU, FPGA, virtual, API-based and others.

9 Claims, 15 Drawing Sheets

— 1f-01

$$b = [(a \oplus s)^2 + (a \oplus sp)^2]^{1/2}$$

— 1f-02

Where $\oplus$ is mathematically defined as:

$$(a_{i,j} \oplus s) = (\Sigma_{p,q} (w(s)_{p,q} * a_{i+p, j+q})$$

Fig. 1f

SYNTHETIC PARTITIONING FOR IMPOSING IMPLEMENTATION DESIGN PATTERNS ONTO LOGICAL ARCHITECTURES OF COMPUTATIONS

This invention is a continuation-in-part of Ser. No. 12/363,738, U.S. Pat. No. 8,060,857, titled "Automated Partitioning of a Computation for Parallel or Other High Capability Architecture," Ted J. Biggerstaff, filed Jan. 31, 2009.

CROSS-REFERENCE TO RELATED APPLICATIONS

Patent application Ser. No. 12/363,738 (now U.S. Pat. No. 8,060,857), Titled "Automated Partitioning of a Computation for Parallel or Other High Capability Architecture," Ted J. Biggerstaff, Jan. 31, 2009.

Patent application Ser. No. 12/766,894, Titled "Non-Localized Constraints for Automated Program Generation," Ted j. Biggerstaff, Apr. 25, 2010.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable.

INCORPORATION-BY-REFERENCE OF MATERIAL SUBMITTED ON COMPACT DISC

Not Applicable

BACKGROUND

1. Field of Invention

In general, this invention relates to programming of computers with various kinds of facilities for parallel or other high capability execution of computer programs, is specifically to the automated generation of programs from execution platform neutral specifications, to the automated partitioning of those programs into pieces that can be executed in parallel or can otherwise exploit a high capability feature of a high capability execution platform architecture, and to the automated choice of the specific partition form that best exploits the parallelism or other high capability feature in a chosen class of parallel or other high capability execution platform architectures.

More specifically, this part of the invention relates to extending the notion of partitioning from the natural partitions (described in the U.S. Pat. No. 8,060,857) to synthetic partitions. Natural partitions describe the inherent, non-discretionary case structure of a target implementation and therefore allow little user choice in whether and how they manifest themselves in the target implementation. By contrast, synthetic partitions extend the machinery of partitions to impose additional constraints on the design features in the target implementation and therefore allow the user a wider range of choice in what design features are included in or excluded from the target implementation. A synthetic partition—in contrast to natural partitions—incorporates one or more design feature choices and is thus a method of requiring the appearance of one or more design features in the evolving target implementation without requiring the immediate act of manufacturing the concrete manifestation of those design features in programming language terms (i.e., in terms of convention programming languages such as C, C++ or Java).

Thus, like natural partitions, synthetic partitions act like a "to do" list, defining what design features will be in the code when it is eventually manufactured. By deferring the act of casting the design features into code immediately, the invention allows the generator to abstractly coordinate several, separately introduced sets of design features on that "to do" list without having to deal with the myriad of structures, relationships and details that would be introduce by a programming language expression of those design features. The invention can integrate, coordinate and manipulate the synthetic objects like atomic entities without having manipulating the extended code they will eventually engender, which is likely not to be atomic in nature and is often dispersed among remotely separated locales in the target implementation. For example, later in this application, a specific example will use a synthetic partition that introduces a framework for thread based parallelism such that the generated code will be spread across three separate routines and will be comprised of code segments that handle thread initialization, control and synchronization for some as yet specified, partitioned data structure. These three routines are skeletal with "holes" for the specific code segments to do the actual computation on the data structure. A separate set of partitions both natural and synthetic will supply code segments for these "holes" as well as some interstitial design tissue that connects and coordinates the skeletal routines with their computational payload or content. Dealing with these complex design features directly in terms of code representations would be so convoluted and complex as to be completely infeasible.

Abstractly speaking, the generator is planning and coordinating the construction of the integrated set of design features in the problem and programming process domain (using natural and synthetic partitions) rather than in the programming language domain (using code). This vastly simplifies the coordination and generation process.

2. Description of Prior Art

This patent application is a continuation-in-part of U.S. Pat. No. 8,060,857, Titled "Automated Partitioning of a Computation for Parallel or Other High Capability Architecture," Ted J. Biggerstaff, Jan. 31, 2009.

This patent extends the U.S. Pat. No. 8,060,857 by extending the partition mechanism and the associated machinery as a mechanism for incrementally sketching the design of the evolving target program in abstract form before facing the challenges of creating and integrating the concrete details that are required by a programming language manifestation of the target program.

Key Machinery Much of the prior art is most easily understood by contrasting it with the key machinery and methods underlying this invention. Thus, the following several paragraphs provide a summary of the key machinery and methods of this invention to serve as a context for the subsequent descriptions of the prior art.

A hallmark of the methods and machinery of this invention, and one that breaks with the tradition of most of today's mechanisms for software generation and in particular, for software generation of parallel and other high capability software, is that this invention performs most of its key operations in the problem domain and the programming process or design domain but not (initially) in the general program language (GPL) domain. What this means is that this invention initially represents its end product largely in terms of problem data and operators (e.g., images and convolutions) and non-programming language oriented abstractions (e.g., associated programming constraints defined in patent Ser. No. 12/363, 738) rather than is programming language data, operators and abstractions (e.g., concretely defined matrices, collections and arithmetic operations). (By way of definition, a convolution is a very general image or signal processing operation that computes output images or signals from input images or signals where each pixel or signal element in the output image or signal is computed from the corresponding input pixel or signal element along with the neighboring pixels or signal elements surrounding that particular input pixel or signal element.)

The invention formulates its output (i.e., the target program) first, in terms of broad-brush design abstractions (e.g., constraints that logically partition a computation into pieces). These design abstractions are easy to create, organize, combine and re-structure and do not yet contain the low level programming (i.e., GPL) details or organizational structure. Adding the GPL details and organizational structure later reduces one large, global and intractable programming problem to a set of locally separated, smaller and therefore simpler programming problems, each within the context of a separate design abstraction. In other words, operating in the problem, programming process, and design domain first, and adding the programming details later means "design first, code later."

The invention expresses that design in terms of a Logical Architecture (LA) that captures the broad brush design in terms of constraints that put important limitations on the form that the final program will take without completely defining that final program at the level of detail and organization that a programming language would require. These constraints are a new kind of abstraction that breaks with traditional representations based on programming language concepts and allows design features to be added into the target program design in a step by step process that is not is restricted or ordered by the constructs and relationships of the programming language domain. This step by step process evolves the LA into a Physical Architecture (PA) that bit by bit develops the details and relationships that a programming language compiler requires.

BACKGROUND OF THE PRIOR ART

U.S. Pat. No. 8,060,857 provides an extensive discussion and analysis of the prior art that emphasizes the important differences between that invention and the prior art. In addition, it includes an extended discussion of why that invention is useful and why it is non-obvious. Since this invention extends the machinery of that invention, that discussion applies to this specific aspect of the invention as well. Beyond that discussion, there are some prior art that is particularly relevant to this invention and deserves discussion to clarify how this invention is specifically differentiated from and is an improvement on that prior art.

A key difference between prior art and this invention is that virtually all prior art in compiling technology, generator technology, computer aided design and engineering (CASE) technology, model driven engineering technology, Aspect Oriented Programming (AOP), Anticipatory Optimization Generation (AOG), optimization based methods and other related technology and methods for creating implementation code from a specification of a computation choose representations for elements of the evolving implementation that are based to some degree upon general programming languages, specialized programming languages (PL) or domain specific programming languages. This representational choice forces conventional generation technologies to introduce programming language forms, organizations and details too soon and thereby make design decisions about the architecture of the solution that will prevent other desired design decisions from being made. Or at least, it will make those other desired design decisions difficult to achieve. For example, these conventional technologies often force a top down, reductionist approach to design where the top level programming structure and the essence of its algorithm are expressed first and then the constituent essence is recursively extended step by step until the lowest level of PL details are expressed. However, that initial structure may be incompatible with some desired design requirements or features that are addressed later in the development or generation process. The initial design may have to be reorganized in order to introduce such design requirements or features. For example, the requirement to fully exploit a multicore computer will require a significant, difficult and many step reorganization to fully exploit the performance improvements possible with multicore. Automation of such reorganizations at the programming language level is seriously complicated and except for relatively simple cases is prone to failure. This is why compilers that can compile programs written and optimized for one execution platform are unable to satisfactorily compile the same programs for a different execution platform with a an architecture that employs a significantly different model for high capability execution and fully exploit the high capability features of the new architecture. For example, programs written for the pre-2000 era Intel platforms are largely unable to be automatically translated to fully exploit the multicore parallelism of the more recent Intel platforms. Human based reprogramming is almost always necessary to fully exploit the multicore parallelism. And this inadequacy of current compiler and generator technology is the focus of this invention, which offers a solution to this problem.

Some other prior art is superficially similar to this research. Some programming languages add domain specific constructs (e.g., "regions") in declarations that bear a superficial resemblance to partitions. (e.g., See B. L. Chamberlain. The Design and Implementation of a Region-Based Parallel Language. PhD thesis, University of Washington, November 2001; and also Lawrence Snyder, A Programmer's Guide to ZPL, University of Washington, Jan. 6, 1999.) While regions seem similar, they are not logical representations in the sense of partitions of this invention and therefore, are not separate from the structure and assumptions inherent to the programming language domain. Partitions can be manipulated and refined quite independently from the detailed constraints introduced by programming languages (e.g., routine structure, parametric plumbing, scoping, organizational commits to threads and particular patterns of parallelism, etc.). Importantly, partitions in contrast to regions allow design features (e.g., parallel threads on multicore architectures), broad organizational commitments (e.g., the edges and center slicer/slicee implementation framework) and programming details (e.g., mapping of the LA into a framework based on problem domain specific logic) to be introduced in a step by step manner as the design and generation of the target program proceeds. This facility is out of the reach of superficially similar constructs embedded in programming languages.

The original patent application and this extension of that patent use a representational element (i.e., an Associative Programming Constraint or APC) that constrains computational elements by a set of assertions that imply features of the target implementation without actually immediately constructing code that contains those features. That allows the invention to integrate and coordinate sets of design features logically and to defer integrating the myriad of low level interstitial programming language constructs that are necessary to make a design rigorously unambiguous enough to keep a programming language compiler happy. The APCs can be propagated over an implementation neutral computation specification during the process of translating that specification. They can be combined according to well defined logic rules. They can be assembled into structures that logically describe how to transform parts of the computational specification (with which they are associated) into the intended implementation forms. This process is certainly not top down or reductionist in any sense and is certainly not driven by structural or programming language imperatives. The very order in which design features are introduced and pinned down is conceptually orthogonal to the order in which design features are introduced by most conventional developmental technologies. Additionally, the process step of pinning down a design feature happens much earlier in the generation process than the process step of actually constructing that design feature in programming language constructs or precursors thereof. What's more, the construction of a design feature is not an atomic process step having to do only with that design feature but rather is often a part of a process step that is constructing and integrating a number interrelated design features as a molecular process.

A key contribution of this invention is the extension of the machinery of the original invention whereby discretionary target program design features and decisions (e.g., parallelization of a computation via threads) can be incrementally incorporated into the evolving target program's logical architecture from U.S. Pat. No. 8,060,857 not initially as explicit, concrete GPL code but rather as abstract design objects called synthetic partitions (i.e., a specialization of an APC). Synthetic partitions capture additional design features of the final design beyond just the iterative and natural partitioning constraints described in the original patent and do so without having to immediately commit those features as detailed, concrete GPL code. By this mechanism, the generator can defer the generation and integration of the low level details until later when the architectural scaffolding of the target program has been derived. For example, the generator can commit to a computational loop being decomposed into several parallel loops that can be run on different processors without yet having to work out the detailed code chunks that comprise the loop chunks, without having to derive the control architecture to relate those chunks of code, without having to reorganize an already derived control structure, without having to wrap thread initialization code around the chunks and without having to formulate the termination code that assures all of the computation threads have successfully completed their parts of the computation. Being constraint abstractions, synthetic partition objects can be manipulated without immediate concern about such programming language level details as data flow, variable liveness, scoping issues and so forth, all of which will come into play once the generator must cast the loop decomposition, thread initialization and termination into code.

OBJECTS AND ADVANTAGES

This invention uses most of the objects of U.S. Pat. No. 8,060,857 and also exhibits most of the advantages of that invention.

The objects and advantages that are more specific to this invention are:

Synthetic Partitions: Natural partitions express the logical case structure of a specific computation. For example, because of the natural case structure of a specific computation, an image pattern detection algorithm may choose to compute edge pixels differently and possibly separately from non-edge pixels in an image. So, such an algorithm would be naturally partitioned into edges and non-edges (i.e., the center). Similarly, an image averaging computation that averages a pixel with all of its contiguous neighboring pixels will need to compute the image corner pixels differently from the edge pixels differently from the non-corner, non-edge pixels because each case averages over a differing number of pixels (e.g., corners average over four pixels, non-corner edges over six pixels and non-corners, non-edges over nine pixels). While natural partitions express the natural case structure of a computation, they do not say much about the design of a target implementation form and therefore, for example, do not do the job of specifying load leveling of the computation over a set of processors. But that level of specification is not really part of their job since this invention factors classes of implementational features into separate sets so that they can be dealt with separately.

However synthetic partitions provide the machinery to take the next step in developing an implementation by introducing additional constraints on the desired implementation. Synthetic partitions are constructed to introduce some design features but not all design features of the final implementation form. In fact, they eschew (to a degree) specifying purely GPL level structures and features because that would introduce so much combinatorial and inter-relational complexity, that the solution space would explode preventing easy solutions and likely as not, preventing most acceptable solutions. Rather, synthetic partitions allow the programming process to be decomposed into stages; one stage that decides which partitions that can be run in parallel and which are best run serially. This first stage is followed by one or more later stages that map the results of the first stage into the code structures that will be needed to implement the synthetic partition constraints in a programming language. For example, synthetic partitions may be constructed to allow the computational load to be balanced among processors without specifying the plethora of coding details necessary to fully implement that constraint. Thus, a synthetic partition implies something about the organization and structure of the developing target program but defers the actual expression of that organization and structure until later because that implied organization and structure is provisional. It may change because of other design features that must also be included in the final implementation (e.g., a particular thread protocol may affect how that organization and structure are mapped into a particular GPL on a particular execution platform).

A synthetic partition does not determine the target program in detail but rather constrains elements of it, e.g., it might require the target program to have some code to split up loops into pieces that can potentially be run in parallel (e.g., the loop over the non-edge portion of an image might slice the non-edge portion into pieces that can potentially be run in parallel). Further, a synthetic partition might imply that separate pieces (e.g., image edges) should be grouped together and run sequentially in a single thread. Moreover, a synthetic partition (in conjunction with execution platform specification knowledge and knowledge of the properties of the specific computation) might constrain the pattern of synchronization among implied parallel computational parts to adhere to some overall synchronization design pattern. For example, if the nature of the computation allows the loops to be decomposed into independent computational parts, then the implied synchronization design might consist of a controller routine that initiates each parallel thread using a set of thread routines for each thread. Each such thread routine would notify the controller routine when it is complete. After initiating all thread routines, the controller routine might have a synchronization construct that waits until all threads are complete. Variations on that design might include some error code that times out if any thread fails to complete in some reasonable time.

The advantage of synthetic partitions is that they allow a design feature (e.g., the slicing of an image center in order to load level a computation) to be provisionally expressed without immediately casting it into a GPL or near GPL form where further design, change and manipulation would be difficult. This mechanism defers making low level design decisions until the broad architectural features are decided and integrated. Furthermore, a design feature like slicing can be combined with other related design features at a conceptual or problem domain level thereby conceptually or provisionally altering the implied GPL design without immediately trying to build in each design feature in a GPL form. For example, a partitioning design feature can be combined with an Instruction Level Parallelism design feature and subsequently, both of these can be later combined with computational load leveling and threading design features.

This style of doing business allows the generator to have a library of frameworks (i.e., GPL like shells) each of which represents some reasonably small combination of related design features. Additionally, each such framework has a set of holes that are tailored to the combination of broad architectural features and designed to receive computational payloads (e.g., partitions of a particular domain specific type). For example a particular framework might be designed to receive partitions such as image edges that are "probably" order n computations (i.e., lightweight computations) or alternatively, to receive partitions such as image centers that are "probably" order n squared computations (i.e., heavyweight computations). Such a framework might introduce a set of cooperating GPL routines, the parametric plumbing between those routines as well as holes that define the details of the input and output plumbing that connects the data items specific to the implementation neutral specification of the computation. There may be further GPL design features such as synchronization and thread control. But the framework says nothing about exactly what kind of a computation is occurring it holes. That will be supplied by the computational payload defined in the logical architecture.

Moreover, additional design features or design variations may be added later. In other words, the generator process can add, at different times of the generation process, different kinds of conceptually related design details that may end up being widely separated from each other within a programming language implementation. By expressing these conceptually related design details logically and atomically (i.e., in the logical architecture) and deferring the expression of them in a programming language formulation, the invention can more easily manipulate, combine and revise the logical atoms before they might be decomposed into mutually remote locales within a programming language implementation (e.g., before they are broken up and put into separate routines).

Logical and Physical Architectures: This invention extends the machinery of U.S. Pat. No. 8,060,857, which introduced the Logical Architecture (LA) mechanism, whose job is to capture the abstract design without commitments to GPL and implementation details. This allowed the program generator to incrementally introduce logical architectural features and later introduce the GPL structure, organization and implementation detail context for those logical features. This allowed a process of is step by step introduction of design features that evolved the LA (eventually) into a Physical Architecture (PA). The PA begins to include the GPL structure, organization and implementation details and eventually evolves to the point where all necessary GPL, organization and implementation features are included after which programming language code files can be directly generated.

The LA logically implies the key design features, major organizational divisions and elements of the target program but defers for later how these LA structures are mapped into GPL level design details, such as how the LA is mapped into routines, functions, threads, parametric connections, data flow connections, machine units, instruction styles, parallel synchronization structures and so forth. By the time the generation has created the PA, most or all of the deferred design decisions have been made and the Logical Architecture has been mapped into the GPL design structures.

Synthetic partitions are a key element of this incremental evolution from a LA to a PA and then to GPL code. The extended partitioning representational structures and machinery allow partitions to go beyond just implying simple decompositions of a computation. Synthetic partitions imply decomposition with simultaneous design feature construction and coordination across related but (possibly) programmatically separated islands of the eventual implementation. For example, a partition may imply both load leveling (i.e., slicing up a partition to achieve a specific design objective) and parallelization of the code that results from that partition. The load leveling or slicing code may eventually reside in a routine that initiates and manages thread execution whereas the actual execution of the computation on the slices may happen in a separate thread routine. The coordination of those two islands of code requires interstitial control and communication code, whose generation is triggered by one or more synthetic partitions.

Design in the abstract Logical Architecture, Code in detailed Physical Architecture: The advantage of having synthetic partition objects that are abstract representations for the broad architectural structures of the target program is that the job of programming can be split into pieces. The broad architectural design can be sketched out abstractly simply by construction of the synthetic partition objects, which imply and constrain that broad structure. The generator is not overwhelmed by low level details as is the case with generators that represent the evolving target program in GPL terms. Later, when it is time to derive the detail representation, the synthetic partition objects imply a series of rather simple, mechanical manipulations of the computation specification. In contrast, other approaches to program generation often produce an infeasibly large and complex search for an implementation. Because most other program generators have chosen representation systems based on the conceptual structures in programming languages, the problem space blows up. Their representation structures are expressed at a too detailed level. Their representation structures contain implicit assumptions and interrelationships that explode the space of possible solutions. Moreover, the nature of those representation structures provides models of abstraction (e.g., object orientation) that are designed for the implementation domain and not the programming process domain or logical architecture domains.

BRIEF SUMMARY OF THE INVENTION

This invention describes how the machinery of constraints (i.e., APCs) can be extended to include synthetic partition objects that introduce design details. These design details often include programming language structures and constructs that are intricately integrated and coordinated across broad architectural swaths of the target implementation. The design structures are introduced by these synthetic partition objects via their association with programming frameworks. The frameworks include coordinated skeletal programming structures (e.g., routines) with holes for parts and pieces of the computational payload that will be derived from a logical architecture of the implementation neutral specification (INS) of the target computational. The frameworks also include object oriented methods that find objects and structures in the LA (i.e., elements of the computational payload for the specific computation being processed) where these objects and structures will play design specific roles in the framework. For example, the portions of the target computation that are specific to a matrix edges play the role of lightweight computational parts. Then the object oriented methods of the framework will map those portions into specific holes within the skeletal routines (e.g., the holes that expect to deal with lightweight processes).

Frameworks often include so called "design patterns" that abstractly shape a computation to a particular class of computations without committing to the concrete details of that computation. (See "Design Patterns," Erich Gamma, Richard Helm, Ralph Johnson and John Vlissides, Addison-Wesley, 1995). For example, the design pattern example used in this description is a thread based parallel computational pattern that treats lightweight portions of the computation (e.g., matrix edges) differently from heavyweight portions (e.g., matrix centers). That is, lightweight portions are designed to execute sequentially in a single thread whereas heavyweight portions are sliced into a number of pieces that are executed in parallel. In its most general form, this design pattern might apply to image processing, data structure processing and perhaps message communication or transaction processing depending on the nature of the computational load in the LA.

An important property of this invention is the high level of independence between the logical architecture and the designs of these frameworks. This allows great freedom of variation in both thereby multiplying the variability in the set of target implementation programs that can be generate. Conventionally, the connection between some early design description (i.e., the analog of the LA for conventional development and generation schemes) and a conventional programming framework is likely to be achieved with representational mechanisms that derive much of their character from programming languages. That is, the connection might be made via API like calls, indirect invocations or other program language like constructs—constructs that pin down overly much of the eventual architecture and detail of the target program created by the conventional mechanisms, and pin them down too early in the development. In other words, conventional connections impose strong interdependence between the early design forms and the framework forms thereby, limiting the range of variation in both and therefore, limiting the size and variability of the set of possible target programs. This is the same shortcoming of the top-down reductionist models of program development that were discussed earlier.

However, in this invention, the generator is not working in the programming language domain. It is working in the problem and programming process domains and therefore, the connection is made via semantics of problem and programming process domains. That is to say, domain semantics provide heuristic information that identifies the targets of the computational payload without having to use programming language like connections or without having to analyze programming language structures to infer computational intent (which in general is infeasible) and make the connection that way. Partition objects have domain semantic properties on which programming design decisions can be made. Thus, matrix edges are domain entities that are heuristically known (typically) to be order n computations (i.e., lightweight computations). Further, matrix centers are heuristically known (typically) to be order n squared computation (i.e., heavyweight computations). This allows heuristic decision making to be used to figure out the specific framework holes that are the likely targets of specific portions of the computational payload in a logical architecture.

Furthermore, heuristic rules operating in the problem domain and programming process domain may also be used to implement finer grained variations in the framework and thereby generalize the frameworks. In other words, the invention allows additional levels of detail in the frameworks to be custom tailored to the specific computation that the generator is dealing with. For example, the designs for communicating data to and from thread routines might be allowed to take differing forms such as global variables, C data structures that package up sets of input/output variables, etc. Thus, it is possible with this invention to defer even more of the detail programming language level design until the very last minute, so to say.

BRIEF DESCRIPTION OF THE SEVERAL VIEWS OF THE DRAWINGS

Drawings

Drawing Figures

KEY REFERENCE NUMERALS IN DRAWINGS

Figure 1A:
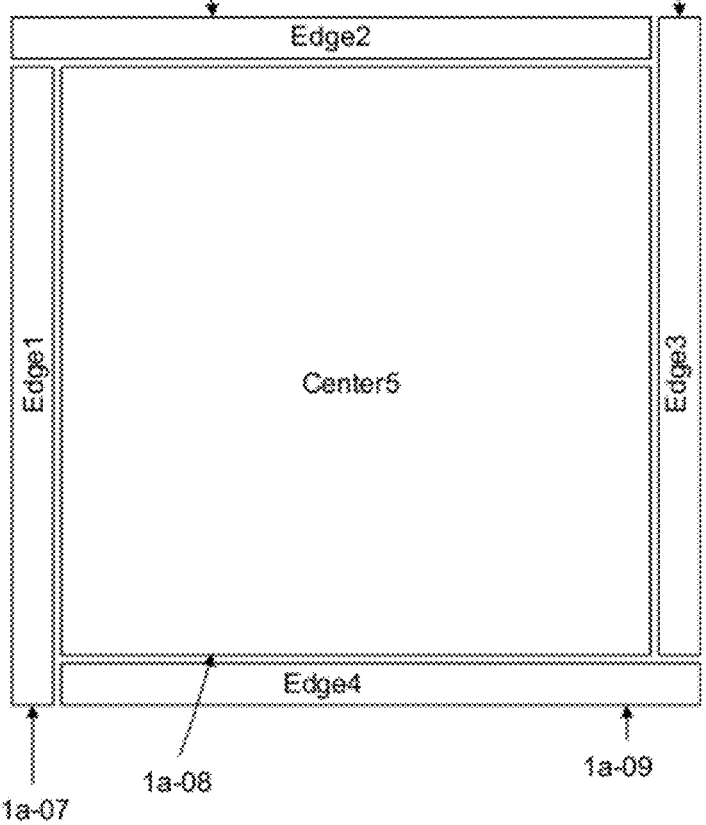
FIG. 1a Logical architecture of loop and partition constraints associated with an INS expression FIG. 1b Example Method-Transform defining w of S FIG. 1c Example of specialized Method-Transform defining w of S-Edge1 and S-Center5

Ref. 1a-01: Association of an expression and a loop constraint

Ref. 1a-02: Partially translated expression within the implementation neutral specification Ref. 1a-03: Association of a loop constraint with a partition set Ref. 1a-04: Loop constraint associated with ref. 1a-02
Ref. 1a-05 through 1a-09: Five natural partitions defining provisional decomposition of ref. 1a-04
Ref. 1a-10: Specializations of design variables for neighborhoods S and SP
Ref. 1a-11: IL Stand-in function that will refine to partitioning condition of some specialization of S
Ref. 1b-01: Definition of Method-Transform of w of S
Ref. 1b-02: Value of variable ArrayReference is pattern to recognize array reference expressions
Ref. 1b-03: Property of the OR expression identifying it as a partitioning condition that selects edge partitions
Ref. 1c-01: Specialization of Method-Transform w of S for Edge1
Ref. 1c-02: Specialization of Method-Transform w of S for Center5
Ref. 1f-01: Image Algebra specification of a Sobel edge detection computation
Ref. 1f-02: Mathematical definition of the Image Algebra's convolution operator $\oplus$
Ref. 2-01: Name of loop APC
Ref. 2-02: Example of loop APC in preferred embodiment
Ref. 3-06 through 3-10: Substitution lists for specializing elements of a logical architecture to a specific partition of FIG. 1a
Ref. 4-03: Loop constraint object associated with synthetic object Center5-ASeg
Ref. 4-04: Loop constraint object associated with synthetic object Center5-KSegs
Ref. 4-10: Specializations of design variables for neighborhoods S and SP extended for new synthetic partitions Center5-KSegs and Center5-ASeg
Ref. 4-12: Synthetic partition constraint object representing center partition with slices
Ref. 4-13: Synthetic partition constraint object representing a slice
Ref. 5-01: Loop constraint associated with synthetic partition object Center5-KSegs
Ref. 5-02: Loop constraint associated with synthetic partition object Center5-ASeg
Ref. 5-03: Loop constraints associated with INS clones specialized to edge partition objects
Ref. 5-04: Loop constraint association with INS clone specialized to center slices
Ref. 5-06 through 5-09: INS clones specialized to edge partition objects
Ref. 5-10: INS clone specialized to a center slice
Ref. 5-11: Previous state of logical architecture (from FIG. 4) from which the INS clone specializations were derived
Ref 6-05: Code framework specific to synthetic partitions derived from center partition
Ref 6-06 through 6-08: Code skeletons designed for logical architecture of FIG. 5
Ref. 7-02 through 7-06: Domain specific insert points
Ref. 8-02 through 8-05: Domain specific insert points
Ref. 9-02 through 9-03: Domain specific insert points

DETAILED DESCRIPTION OF THE INVENTION

The Problem

A key problem in exploiting the capabilities of various existing and future execution platform architectures for a specific target computation is the dilemma between the goals of precisely describing the implementation of a target computation and yet still retaining the ability to cast the implementation in a variety of forms each of which exploits a differing set of high capability features of some specific execution platform architecture (e.g., parallel processing via multicore based threads). The key culprit in this dilemma is the representation system used in the course of creating a target program—that is, the use of programming language (PL) based abstractions to represent the evolving program at each stage of its development. Einstein said "We see what our languages allow us to see." And when a computer scientist understands his or her world in terms of programming languages, it is natural to construct intermediate design and precursor representations in terms of programming language based abstractions. And this has led to our conventional, reductionist, top-down models of program design and development, which has been the key impediment to mapping an implementation neutral specification of a computation to an arbitrary platform while still exploiting whatever high capability features that platform possesses.

In such a top-down model, the structure and some details of a layer of the target program are specified along with some abstract representation of the elements (i.e., lower level layers) of that upper layer. In human based application of top-down design, the abstract elements of the lower level layers are often expressed in terms of an informal pseudo-code. In the automated versions of top-down design, the pseudo-code is often replaced by formal expressions (i.e., programming language based expressions) of the interfaces to the lower level layers, which may be simple PL calls, object oriented invocations, or skeletal forms of elements that remain to be defined. Alternatively, these interfaces may be calls or invocations to fully defined API layers or interfaces to message based protocols (e.g., finite state machine specifications). In any case, the structure is fixed at some high level before the implications of that structure become manifest in some lower level at some later time in the development process. The implications of refinements within the lower layers often require changing or revising the structure at a higher level, which can be problematic. Further, in an automated system, distinct programming design goals will be, by necessity, handled at different times. This is further complicated by the fact that two or more design goals may be slightly inconsistent (at some detail level) or at least, they may be difficult to harmonize.

A good example of this kind of difficulty is trying to design a program to exploit thread based parallel implementation. The exact structure and details of the final program are subtly affected by a myriad of possible problem features and programming goals. A threaded implementation will require some thread synchronization logic which may be spread across a number of yet to be defined routines. The specific form of the computation may affect:

What parts of the computation are candidates for parallel threads and what parts are more profitably performed as sequential computations (e.g., a part that will be an "order n" computation might not deserve its own thread whereas an "order n squared" computation might well deserve many separate parallel threads and therefore must be decomposed), Whether and how those candidates need to synchronize their computations (thereby affecting the exact form of thread synchronization logic), Whether and how those candidates might be decomposed into computational chunks, How to express the thread protocol logic that may be spread and coordinated across several routines (e.g., how to initiate, monitor and verify the completion of threads), How to communicate data to and from a thread routine (e.g., some thread APIs limit a thread routine to one parameter thereby forcing a design decision between communication of input and output data to thread routines via global variables or communication via a pointer to a structure containing input and output data), How to work around errors in APIs (e.g., a begin thread operation may not return a proper thread handle thereby requiring an additional get-thread-handle operation), And so forth.

If an automated generator tries to handle all of these design issues at once, there is an overwhelming explosion of cases to deal with and the approach quickly becomes infeasible.

The ideal solution would be to be able to recognize design goals and assert the programming process objectives provisionally (e.g., organize the computation to exploit threads) without committing fully and early on to constructing the PL structures and details because those PL structures and details are likely to change and evolve as the target program is refined toward a final implementation. The ideal solution would allow each design issue or feature to be handled atomically, one at a time. Then, if necessary, those previously asserted provisional commitments could be altered before they are cast into concrete code. And this is the essence of this invention.

This invention allows the construction of a logical architecture that levies minimal constraints on the evolving program and explicitly defers generating programming language expressions early on. That is, initially the LA will constrain only the decomposition of a computation into its major organizational divisions (which are called partitions) without any details of the programming routine structure or programming details of those major organizational divisions. There is no information on control structure, routines, functions, threads, parametric connections, data flow connections, machine units, instruction styles, parallel synchronization structures and so forth. All of that is deferred and added step by step as the generation process proceeds.

A key innovation of this invention is a mechanism for revising the organization and forms of partitions to allow the inclusion of synthetic partitions. Synthetic partitions will introduce coding structures, relationships and program language level designs and cliches by connecting the synthetic partitions (directly or by implication) to frameworks, where a framework is typically a set of interrelated skeletal routines and their control structure that commits to some of the code level infrastructure to support a computation but does not include the computational content (i.e., computational payload) itself. Additionally, frameworks are objects, which have methods that affect the mapping elements of a logical architecture into the framework's skeletal infrastructure and the coordination of those LA elements of that infrastructure. For example, a framework that incorporates a thread-based design for computing a convolution of an image will comprise three skeletal routines: 1) a manager routine that contains the control logic skeleton for creating and initiating threads, synchronizing them and assuring proper termination; 2) a thread routine for packaging into a single thread a series of lightweight computations that are not substantial enough for their own threads; and 3) a thread routine for decomposing heavyweight convolution operations into separate computational parts and initiating a thread for each. In a sense, such a framework is a hybrid LA/PA element. It is an LA element because it does not (and in fact cannot) immediately commit to the explicit construction of the details of the frameworks but must await the generation steps that will integrate and coordinate the computational payload into the framework skeletons. It is a PA element in the sense that some of the coding level structures, details and interrelationships have been committed to.

This framework method may also setup target program variables that must be globally available to one or more of the skeletal framework routines. For example, it may create pointers to the input and output data (e.g., a and b in the examples herein) as a communication mechanism to and from the skeletal routines. This is the communication method chosen in the example that shows the evolution of the slicee routine (i.e., Sobel1CenterSlice10) later in this description. Because the C language allows arrays and matrices to be treated like pointers, the generator does not need to create separate pointers to A and B. It simply needs to assure that A and B are accessible to the framework routines and to generate the correct code where they are used within the framework routines. Note in the final form of Sobel1CenterSlice10 later in this description, the (somewhat ugly) expressions like "((* ((*(A+(I)))+J)))" implies that A and B are in fact being treated like pointers. This framework method will simultaneously bind these target program variable names to generator pattern variables (e.g., ?inDec1 and ?outDec1) for use in definitions used in the integration with the LA and then in the expansion and evolution of the framework routines.

The framework method may also create globally available data (e.g., "rowcount", which is the step size of the slicer loop constraint) to be used at runtime. Alternatively, such data (if they are constant values) may be bound to a generator design variable specific to the framework (e.g., ?rowcount) and injected into the evolving design at generator time. The exact design choices for frameworks are up to the domain engineer that creates them and the requirements that arise from the needs of the specific framework.

A further innovation is that framework objects provide operational elements (i.e., object oriented methods) for mapping pieces of the LA architecture into the framework's skeletal routines using problem domain semantics rather than programming language structures and control elements. Problem domain semantics are the domain properties of the elements in the LA. These properties imply, for example, that some partition object in the LA is computing on an image matrix "edge" or "center" and based on the properties associated with matrix edges and centers, that these are likely respectively to be "lightweight" and "heavyweight" processes. These domain semantics will determine where and how LA structures are injected into the framework's skeletal routines. By contrast, in a purely programming language based representation of an evolving target program, the programming language structures that would be the analogs of the LA and the framework elements of this invention would have to be analyzed to determine the correlation between the pieces of the LA analogs and the slot requirements of the framework. In other words, an automatic generator would have to analytically extract the programming intention (i.e., essentially the domain semantics) from both the LA analog pieces and the framework slots in order to determine the correspondence of and how to synchronize related elements. However, in the representation system of this invention, those intentions are known by the system in terms of problem and programming process domain semantics because those semantics are inherent to the objects in the LA and the framework. For example, an edge computation is typically an order n computation (i.e., linear computation) whereas a center computation is typically an order n squared computation (i.e., two nested loops processing m groups of n things where m and n are roughly the same order of magnitude hence, leading to the "order n squared" terminology). This information provides useful (heuristic) clues as to what is best computed sequentially and what is best computed in parallel. It also suggests how to formulate or design each such computation. Using domain semantics to map the LA into the framework reduces the programming language detail connections to the framework that have to be dealt with by the generator. This generalizes the solution because such heuristic rules may apply to many concrete situations. That is to say, one general framework can accommodate a number of logical architectures with widely varying domain semantics. For example, the example framework described earlier might apply not only to matrix edges and centers but also to a tree-based data structure computation that has the same characteristic form, i.e., a number of lightweight computations (e.g., order n computations) that can be batched together in a single thread and a heavyweight computation (e.g., order n squared) that can be decomposed into parallel computations in a method similar to that of the matrix computation. The framework need not be specific to matrix edges and centers. It only needs to be specific to some general properties of the target computation.

In contrast, if the connections were formed as PL "call expressions" it would require a fair amount of construction and coordination just to perform the mapping, Both the routine called (e.g., routine and its interface) and the call site (e.g., its parametric plumbing) would have to be custom designed and constructed by the generator and then connected into relevant parts of the framework. These interfaces would have to be custom built. Most of this work would be simply to accommodate the requirements of programming languages.

The Example

This section describes an example computation that will be used in the follow-on description of the invention. Suppose, for example, that one wants to develop a program that performs Sobel edge detection on a grayscale image (i.e., where the pixels are shades of black and white). (See Gerhard X. Ritter and Joseph N. Wilson, The Handbook of Computer Vision Algorithms in Image Algebra," CRC Press, 1996.) Such a program would take, for example, the image in FIG. 1*d* as input (call this image "a") and produce the image of FIG. 1*e* as output (call this image "b"). The output image has been processed so as to enhance edges of items in the image by a method called Sobel edge detection.

The computation of each black and white pixel in the output image "b" is computed from an expression involving the sum of products of pixels in a region around the corresponding pixel in the input image "a" and coefficients from a matrix (defined by an entity called a template or called by the more informative moniker neighborhood) that are associated with the pixels in that region of "a". In the following examples, s and sp will designate neighborhoods. Mathematically, the computation of each b[i, j] pixel is defined as $$\{\forall i,j(b_{i,j}:b_{i,j}=sqrt((\Sigma_{p,q}(w(s)_{p,q}*a_{i+p,j+q})^2+(\Sigma_{p,q}(w(sp)_{p,q}*a_{i+p,j+q})^2))\}$$

where the coefficients (which are also called weights) are defined by the function "w". The weights are all defined to be 0 if the center pixel of the template corresponds to an edge pixel in the image (i.e., w(s)=0 and w(sp)=0), and if not an edge pixel, they are defined by the s and sp templates defined below. p and q are the indexes of the templates. It is convenient to index the templates in the DSL from −1 to +1 for both dimensions so that the current pixel being processed is at (0, 0) of the template.

$$w(s) = P\left\{\begin{matrix}-1\\0\\1\end{matrix}\begin{bmatrix}\overset{\phantom{-1}\overset{Q}{\overline{-1\ 0\ 1}}}{-1} & -2 & -1\\0 & 0 & 0\\1 & 2 & 1\end{bmatrix}\right.$$

$$w(sp) = P\left\{\begin{matrix}-1\\0\\1\end{matrix}\begin{bmatrix}\overset{\phantom{-1}\overset{Q}{\overline{-1\ 0\ 1}}}{-1} & 0 & 1\\-2 & 0 & 2\\-1 & 0 & 1\end{bmatrix}\right.$$

Since an implementation of this computation for a parallel computer may not be organized like the mathematical formula, it is useful to represent this specification more abstractly because such abstractions can defer the implementation organization decisions to a later point in the programming process and thereby allow the computation (i.e., what is to be computed) to be specified completely separately and somewhat independently from the implementation form (i.e., how it is to be computed). From a practical point of view, this means that the abstract computation specification is independent of the architecture of the machine that will eventually be chosen to run the code. So, by simply choosing a different machine architecture for the implementation form without making any changes to the specification of the computation (i.e., the what), one can automatically generate a different implementation form that is tailored to the new machine's architecture. More to the point, porting from one kind of machine architecture (e.g., machines with instruction level parallelism like Intel's SSE instructions) to a different kind of machine architecture (e.g., machines with large grain parallelism such as multi-core CPUs) can be done automatically by only making trivial changes to the machine specifications and no changes to the computation specification (i.e., the what). The publication form of the Sobel Edge detection mathematical formula (defined above) is based on a domain specific language (DSL) called the Image Algebra. Re-expressing the mathematical formula (defined above) in the domain specific Image Algebra language produces the following form (see also Ref. 1*f*-01):

$$b=[(a\oplus s)^2+(a\oplus sp)^2]^{1/2}$$

This DSL will be the basis of what will be defined as the Implementation Neutral Specification (INS) in the examples used throughout the remainder of this document. The mathematical definition of the convolution operator ⊕ shown in Ref. 1*f*-02 uses a mathematically oriented formalism for the weight function w. The definitions of w used in this description will be expressed in a slightly more utilitarian if more pedestrian form than that of Ref. 1*f*-02. Examples of this more pedestrian form of w are provided in FIGS. 1*b* and 1*c*.

The Invention

U.S. Pat. No. 8,060,857 described and demonstrated how an automated program generation system could derive high capability implementations from two separate user provided specifications: a domain specific Implementation Neutral Specification (INS) of a target computation and a separate domain specific specification of the target execution platform. The only additional information needed from the user was some user-known domain knowledge about what elements of the INS determined the natural case structure (i.e., partitioning structure) of the computation. A key property of the INS is that it is neutral with respect to any implementation of that is computation in the sense that it contains no information or clues as to the implementation architecture. A person would be unable to determine architecture of the target implementation by examining the INS. He could not determine if the implementation exploited threads and multicore parallelism, vector instructions, a GPU, Field Programmable Gate Array (FPGA) hardware or other design features. Further, the exact programming architecture (i.e., routine organization and structure) and data flow are also undetermined by the INS.

The U.S. Pat. No. 8,060,857 described and demonstrated how an initial logical architecture was created using information developed during the translation of the INS along with domain knowledge supplied by the user. See FIG. 1a for a conceptual example of an initial logical architecture. Later, we will illustrate the nature of a logical architecture more concretely by examining how it is expressed in the preferred embodiment. This logical architecture is built out of elements that include Associative Programming Constraints (APCs). APCs limit but do not fully determine the target implementation. These APCs come in two general varieties: Loop constraints and partition constraints. Each of these two classes is open ended to extension by the addition of more specialized versions.

The loop constraints partially and provisionally constrain or limit the nature of loops over data structures such as an image matrix or a digital signal array and they do so without explicitly determining the final form of those loops. The loop constraints are associated with pieces of the INS meaning that the pieces of the INS will eventually refine into loop bodies. For example, in FIG. 1a, Ref. 1a-01 is the association between Ref. 1a-02 (a piece of the INS) and Ref. 1a-04 (a specific loop constraint). These loop constraints are "logical" in the sense that they are defined by a set of is logical assertions that may be revised and added to as the generation process proceeds. That is to say, these loop constraints are partial and provisional. They may, and almost certainly will, change and evolve in the course of the generation process. Eventually, these assertions will be complete and final enough that they will imply concrete programming language (e.g., C) loops in the context of real code.

The second variety of APC is the partitioning constraint, which provides a partial and provisional constraint on how the computation or part of it is naturally divided into computational cases. A partitioning constraint (or partition for short) is an instance of an object in the preferred embodiment. Like the loop constraint APC, a partition APC is also specified by a set of logical assertions. These represent a condition, which is called the partitioning condition, that determines logically how the INS or part of the INS associated with a partition or a set of partitions may be partitioned or decomposed. More specifically, a partition set may imply how a partial and provisional loop may be partitioned or decomposed into the eventual implementation form. (See FIG. 1a, where a loop constraint (ref. 1a-04) is associated via ref. 1a-03 with a set of partitions (refs. 1a-05 through 1a-09).) The partitioning condition determines nothing else about the implementation—nothing about the implementation architecture, routine structure, parameter connections, data flow, parallelism, thread structure, vector instructions, data scoping, etc. All of that detail will be added over the course of the generation process A partition contains another piece of bookkeeping information—generator design variables that are specialized to that partition and their unspecialized progenitors. For example, if SP is a generator design variable representing a convolution neighborhood, it may be associated with a set of Intermediate Language (also called IL) definitions that define how operations on SP will be mapped into code or precursors to code. Specialized versions of such design variables (e.g., SP-Edge1) may also exist to indicate that SP-Edge1 is specific to that chunk of code that is constrained to processing the Edge1 partition. In this case, the IL of SP-Edge1 is that set of IL definitions for SP that have been specialized to the partition Edge1. The partition object Edge1 will keep track of substitutions that will be needed to specialize the INS expressions to Edge1. In the later generator phase that in-lines those IL definitions, these specialized generator design variables (e.g., SP-Edge1) will produce computational forms that are specialized to a particular partition (e.g., Edge1).

Additionally, a partitioning object also carries some domain specific semantics that will be exploited during the generation process. In FIG. 1a, the partition set (refs. 1a-05 through 1a-09) carries domain specific semantics that express "edge-ness" and "center-ness" of a matrix. And the generator knows about edges and centers, among other domain specific entities. This provides heuristic knowledge that the generator can and does use.

Firstly, these tokens (e.g., "edge" and "center") are used to generate human friendly names (e.g., "edge1" and "centers") that evoke a sense of what these items are. This is very useful for the domain engineer, who is the technical person that is tasked to build extensions of the generator for extended domains or even different domains (e.g., the data structure domain). These human friendly names are very helpful in debugging the transformations that step by step refine the INS into a target implementation. The domain engineer supports the application programmer who writes the INS and the execution platform specifications to solve particular computing problems on various target platforms.

The second and more important use of this heuristic domain knowledge by the generator is for heuristic rules that mimic the way a human makes design decisions. That is, it allows the generator to make design decisions and formulate architectural patterns for the implementation based on program domain and programming process domain knowledge rather than low level programming language detail information. It allows the generator to view the forest rather than the trees. For example, when choosing a code framework in which to map an LA, heuristic domain specific knowledge can be used to make design choices. More specifically, consider the knowledge that "edges" of matrices are usually involved in "order n computations" (meaning they have only one loop controlling them resulting in some integer "n" computational steps) whereas "centers" are usually involved in "order n squared computations" (meaning there are a pair of nested loops resulting in some (n*m) computational steps). This knowledge can be used to choose how to allocate computational content to parallel threads. Using separate threads for each such edge computation would likely create thread setup overhead that would compromise and maybe eliminate any gain that might be achieved by computing those edges in parallel. Therefore, in a subsequent example, the generator uses a heuristic rule based on this knowledge and in that example, chooses to map all of the edges in the LA (see FIG. 5, refs. 5-06 through 5-09) into a single thread routine (see FIG. 9). In the same example, centers are decomposed into a number of parallel threads. This is a heuristic rule that is invoked in the absence of user specific instructions in the execution platform specification. In contrast, making this same decision by only analyzing a code based representation of the computation would require extensive is analysis that would in effect just derive domain knowledge that is already known by this invention—i.e., the edge computations are lightweight and the center computation is heavyweight. If that analysis were successful (and it is a big if), the framework choice would be the three routine design that slices up the heavyweight into separate threads and composes the lightweights into a single thread. That is a lot of work just to get to a decision that is more easily made using easily available heuristic knowledge.

The opportunity for such domain specific heuristic rules is open ended, especially in light of the fact that the semantic subclasses of partitions are also rich and open ended. Different example problems may introduce other domain specific semantics. For example, in the matrix domain, the semantic subclasses include corners (e.g., in a partition of an image averaging computation corners are special cases); non-corner edges also used in image averaging; upper and lower triangular matrices, which are used in various matrix algorithms; diagonal matrices; and so forth. By contrast, in the data structure domain, domain semantic subclasses include trees, left and right subtrees, red and black nodes, etc. While the existence of all of these subclasses may give the impression of an explosion of special case treatments, inheritance allows combinations of subclasses with common properties to use singular rules that affect the whole class. Thus, highly specialized case rules are only rarely required.

Partitions play an important role in organizing generator IL definitions. The generator uses generator design variable names to designate concepts that exist and are useful at program specification or design times but often do not manifest themselves as concrete programming language entities in the target implementation. A neighborhood (or to use the superclass term, a template) is an entity that may be is used at specification time and generator design time but does not map directly into a programming language entity in the implementation. The U.S. Pat. No. 8,060,857 used S and SP to represent convolution neighborhoods around some current pixel being processed. Intermediate Language (or IL) definitions specific to those design variables are expressed by object oriented (OO) method-like definitions called Method-Transforms (MT). That is, their specification form looks like an OO method definition but in fact, they are implemented (in the preferred embodiment) as transformations with a left hand side pattern (i.e., the analog of an OO method's parameter sequence) and a right hand side rewrite expression (i.e., the analog of an OO method's body). A concrete example is the MT w, which defines how convolution coefficients are to be computed based on the absolute position of the current pixel in an image matrix and the relative position of the neighborhood pixel in some specifically defined neighborhood (e.g., S or SP).

Figure 1B:
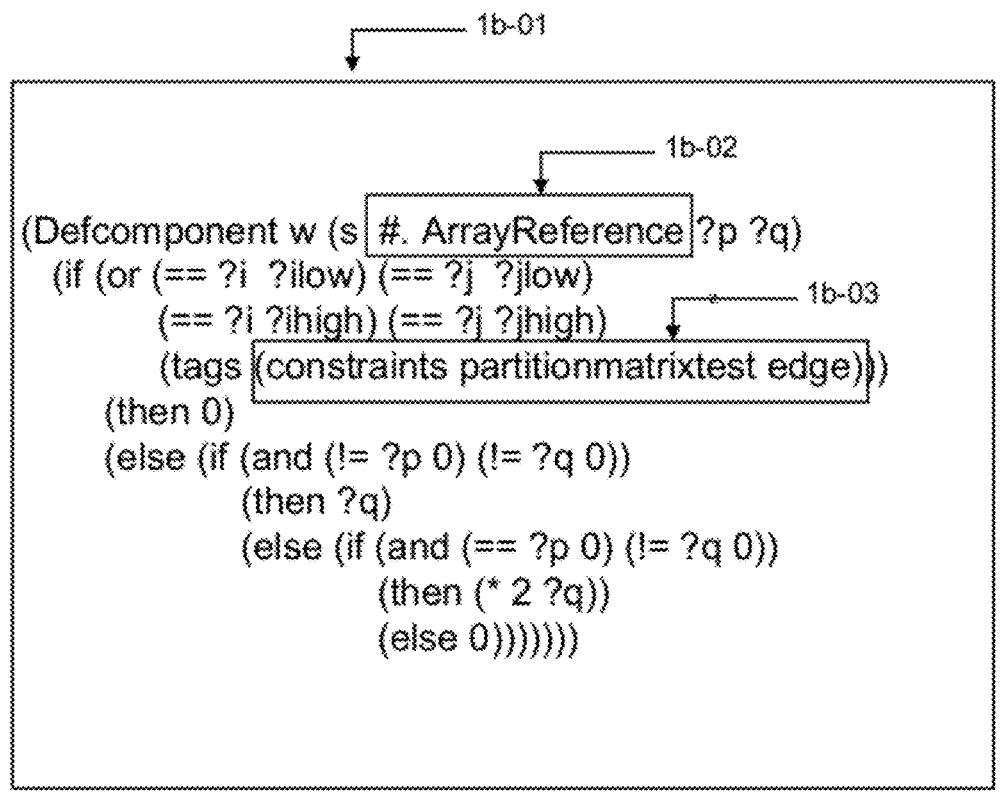
FIG. 1d Example input image
FIG. 1e Example output image
FIG. 1f Example implementation neutral specification (INS) of a computation
Figure 1C:
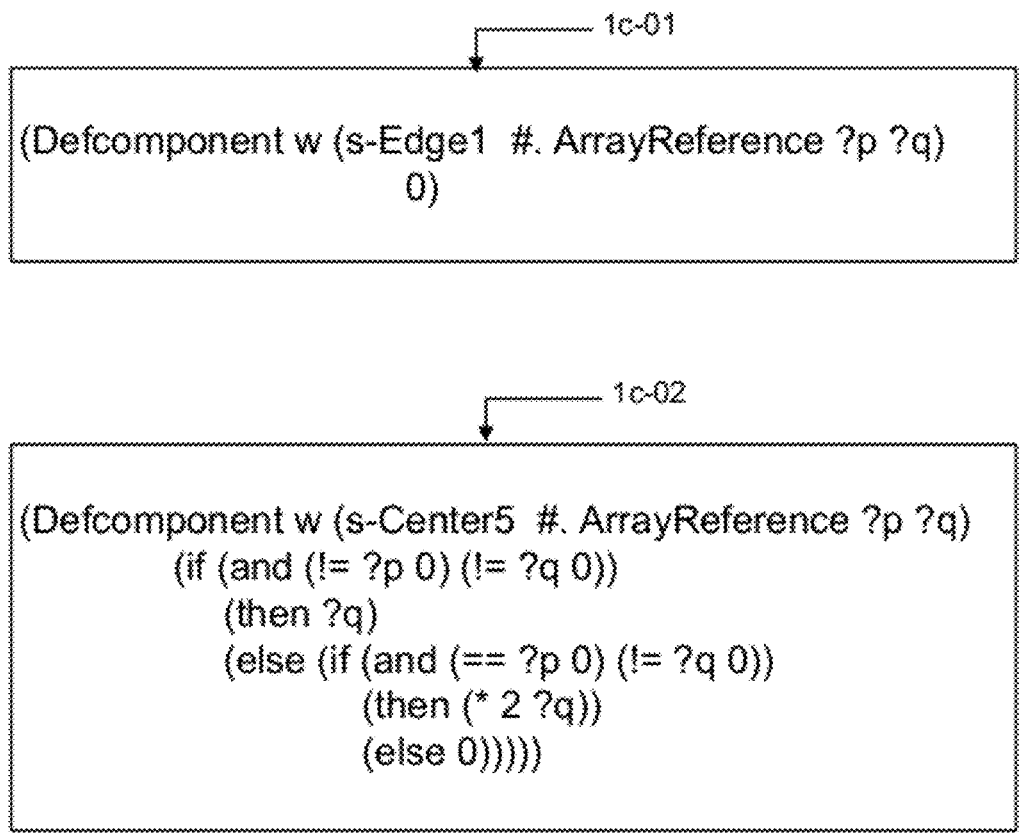
Figure 1E:
Figure 1D:

For a concrete example, see the definition of the MT w of S in FIG. 1b. In this example, #.ArrayReference (Ref. 1b-02) is the name of a utility pattern (defined by the generator) that will match an array reference (i.e., aref) expression and bind the index names of the matrix loop index names to ?i and ?j. The neighborhood loop index names will be bound to ?p and ?q by the latter part of the overall parameter sequence pattern. The "tags" expression is a property list for the OR expression, of which it is the last element. A property on the tags list (and the only property in this example) is the "constraints" property expression (Ref. 1b-03). It identifies the OR expression as a partitioning expression that will identify matrix edges. Consequently, that OR expression will be the seed from which the partitions within our example will be generated. Further, the structure of the topmost else clause will eventually re-appear in the code generated to process the center (i.e., non-edge) partition.

Partitions have a singularly important MT called Partestx, which defines the partitioning condition of its object. For example, Partestx(SP-APartition) will eventually refine into a specific partitioning condition expressed in terms of the programming language variables within a specific locale within the implementation code (i.e., a specific chunk of code representing a specific partition, in this example, the partition "APartition"). More concretely, Partestx(SP-Edge1) Ref. 1a-11 from FIG. 1a, would be applicable to and true within that chunk of code that arose (partly) from the Edge1 constraint. Thus, the partitions give rise to specializations of the IL definitions for design variables and these specializations will refine into code specific details that may vary from locale to locale (i.e., partition to partition). These design variable specializations are an organizing mechanism to define and keep track of the different definitions that pertain to different locales in the LA, the PA and the final target implementation. Ref. 1a-10 provides a summary of the specialized generator design variables that determine each specialized set of IL definitions for the example of FIG. 1a.

In the U.S. Pat. No. 8,060,857 as well as in this description, the specialization scheme for generator design variables is extended to keep track of changes and specializations of the IL that arise from adding or encapsulating various design features in the evolving architecture. For example, adding a design feature to use C style indexing rather than the indexing scheme from the domain specific specification language (i.e., the Image Algebra) will result in specialized design variables (e.g., SP-0) whose IL definitions will generate code consistent with C style indexing. (See Gerhard X. Ritter and Joseph N. Wilson, The Handbook of Computer Vision Algorithms in Image Algebra," CRC Press, 1996.)

Figure 2:
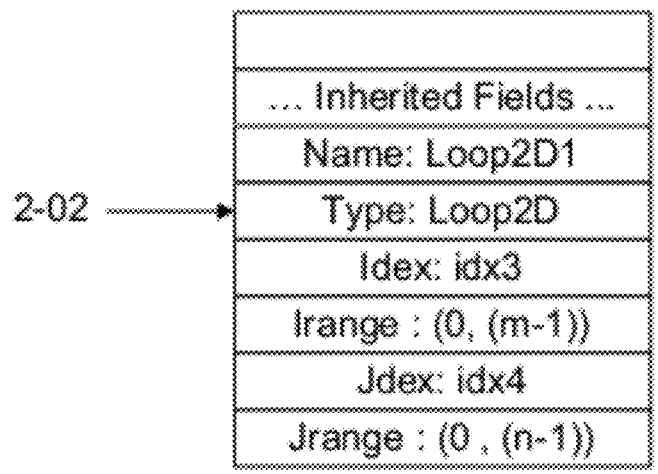
FIG. 2 Example of loop partition constraint object in preferred embodiment
Figure 3:
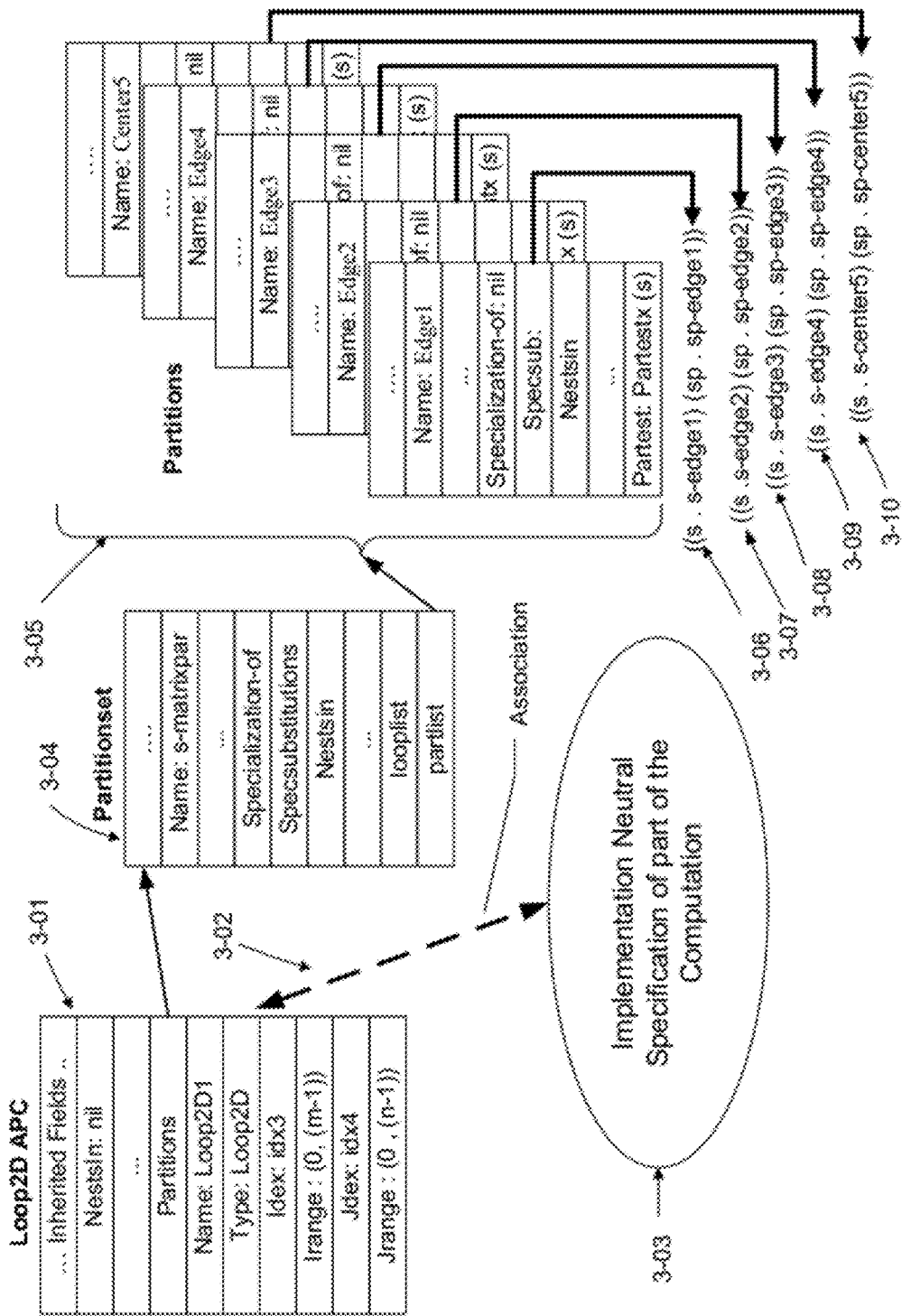
FIG. 3 Example of loop constraint object and set of partition constraint objects from FIG. 1a in preferred embodiment form FIG. 4 Repartitioning of logical architecture of FIG. 1a introducing synthetic partitions FIG. 5 Logical Architecture after cloning and specializing

FIGS. 2 and 3, provide concrete examples of how mechanisms such as a loop APC, a partition APC and a partition set are organized in the preferred embodiment.

Given this background, now let us introduce synthetic partition objects, explore how they change the logical architecture and describe how they are used evolve the logical architecture into the physical architecture and eventually into executable code.

Figure 4:
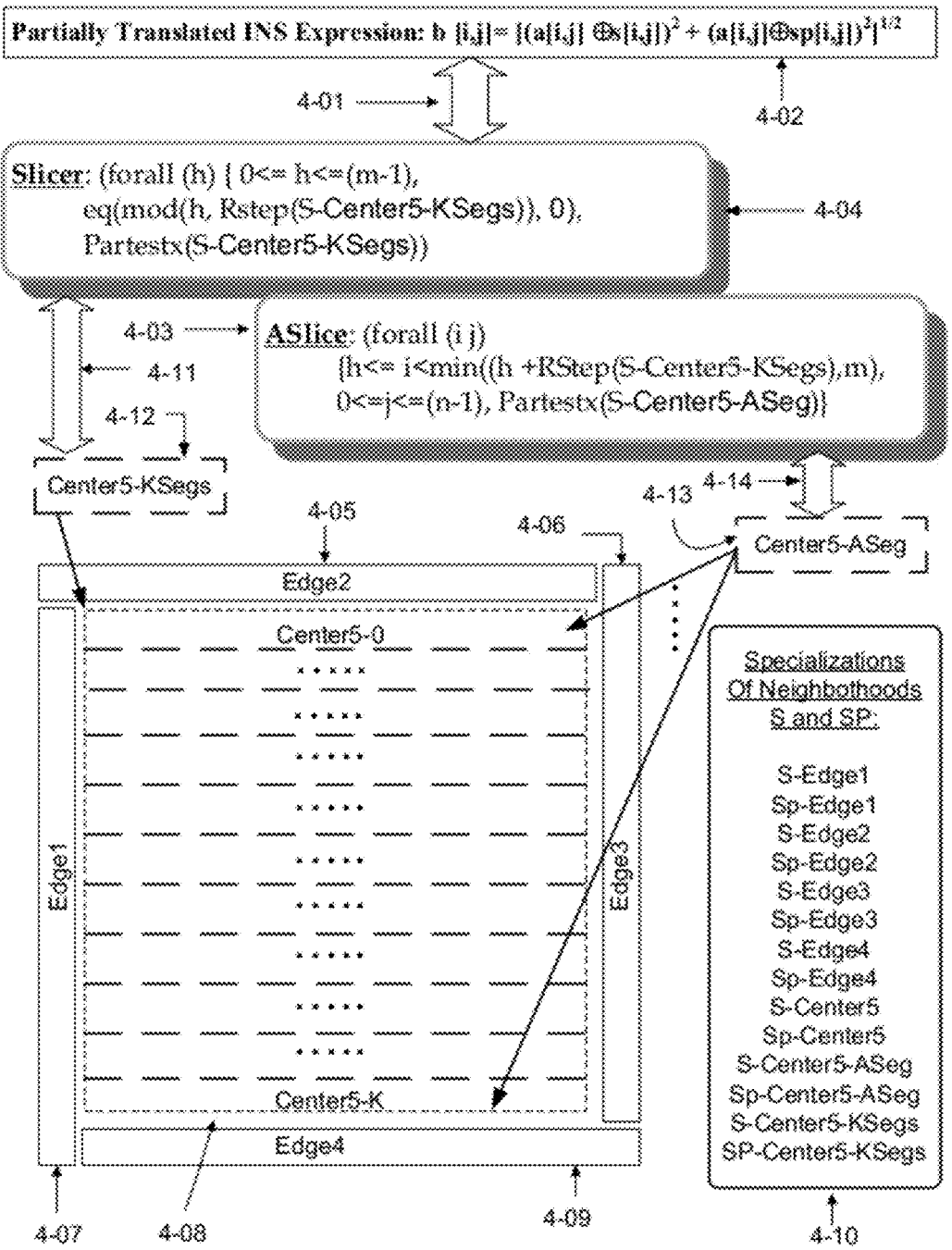

In this invention, the generation process is divided into named phases, each of which has a narrowly defined generation purpose. The phase most relevant to this invention is the SyntheticParititioning phase. During the SyntheticParititioning phase, the generator introduces design features (via synthetic partition objects) that will constrain the evolving LA to be much more specific to some execution platform. These synthetic partitions imply implementation structures that exploit high capability features of the execution platform and that, when finally re-expressed in a form closer to code, may have wide ranging and coordinated affect on the LA (e.g., via multiple routines that coordinate the use of multicore parallel computation). The SyntheticParititioning phase operates on the logical architecture to reorganize the partitions and probably (depending on the execution platform spec) to create synthetic partitions that connect to one or more code frameworks. These frameworks hold the implementation details to be integrated into the evolving target program. FIG. 4 illustrates an example of this synthesis process extending and reorganizing the LA of FIG. 1a. The synthesis process for this example includes the following detailed steps.

Lets us say that the execution platform spec requires that the computation should be load leveled (i.e., sliced into smaller computational pieces) in anticipation of formulating the computation to run in parallel threads on a multicore platform, which we will assume is also included in the execution platform spec. Given these assumptions, load leveling will introduce two synthetic partitions (Center5-KSegs, Ref. 4-12 and Center5-ASeg, Ref. 4-13) that respectively express the design feature that decomposes the center partition (Center5, Ref. 1a-08) into smaller pieces (i.e., Center5-KSegs) and the design feature (i.e., Center5-ASeg) that processes each of those smaller pieces. Simultaneously, the loop constraint Ref. 1a-02 from FIG. 1a, is reformulated into two loop constraints (i.e., Slicer, Ref. 4-04 and ASlice, Ref. 4-03) that will be required by the synthetic partitions Center5-KSegs and Center5-ASeg to formulate the correct code. This synthesis process also introduces specialized versions of the generator design variables S-Center5 and SP-Center5 for Center5-Ksegs and Center5-Aseg (Ref. 4-10) that keep track of specialized IL. IL for these newly specialized generator variables will be generated that maps any use of loop range or step size from Ref. 1a-02 to the range and step sizes implied by the newly minted loop APCs Slicer and ASlice. This is explained in detail in the following paragraphs.

With synthetic partitions, predetermined design frameworks and structures play a more predominate role in shaping the final form of the code and the partitioning conditions play a lesser but still important role. The partitioning conditions for Center5-KSegs and Center5-ASeg are formulated simultaneously with the formulation of the loop constraints Slicer and ASlice (Refs. 4-04 and 4-03) and are basically implications of those formulations. How does this work?

Recall that partitioning conditions arise from within IL definitions for domain specific variables (e.g., S and SP representing neighborhoods) that appear in the INS. The partitioning conditions in the IL are identified by user specified domain knowledge of some condition within that IL that will define a natural partitioning. Such design variables (e.g., SP) and their specializations (e.g., SP-Edge1) serve as handles by which the partitioning conditions can be specified. Of course, a partitioning condition will not be expressible concretely (i.e., in programming language specific names) until late in the generation process when the LA has evolved sufficiently so that the code level forms are settled and have found their locales within the target implementation. Before that point, they are represented by stand-in expressions, specifically the MT Partestx parameterized by one of these design variables. In the fullness of time, that stand-in expression will refine into a concrete form specific to a particular locale in the target implementation. Early on in the LA, this Partestx stand-in expression is generalized and represents a set of different partitioning conditions (e.g., Partestx(SP)). The partition objects record the general form of the partitioning condition stand-in (e.g., Partestx(SP)). See the Partest fields of the partition objects in Ref. 3-05. The partition objects also record the substitutions that will transform that general form of code specific to a set of partitions (e.g., Edge1, Edge2, . . . , Center5) into code specific to one of those partitions (e.g., Center5). See the values of the Specsub fields (Ref. 3-06 through 3-10) of the partition objects in 3-05. As the LA evolves, the INS will be cloned and specialized leading to specialized expressions of partitioning conditions for each of the cloned and specialized chunks of the INS, e.g., Partestx(SP-Edge1) or Partestx(SP-Center5). See the specialized cloned INS expressions Refs. 5-06 through 5-10 in FIG. 5.

With that bit of context, let us see how the new loop constraints and their associated synthetic partition objects are formed from the initial loop constraint Ref. 1a-04 and its associated partition object Ref. 1a-08 in the LA of FIG. 1a. The Slicer loop constraint (Ref. 4-04) must generate a loop, which calculates the first member of a Center5-ASeg slice of the center partition. That slice will be "rowcount" rows high.

Recall that rowcount is the global variable that will be introduced by the framework associated with the synthetic partitions Center5-KSegs and Center5-ASeg. Rowcount's value may be a constant or an arithmetic expression of target program variables (e.g., (−M 1)). Slicer will need a new integer index h that has the same range as the Ref. 1a-04 loop constraint (i.e., $0<=h<=(m-1)$) and a step size of rowcount. In the preferred embodiment, this relationship would be stored in the assertion (_range 0 (−m 1) rowcount) and converted into a set of canonical inequalities for inference purposes. For precursors of the step size in the code expressions, an MT such as RStep(S-Center5-KSegs) will serve as a stand-in until the target implementation is sufficiently refined to determine the concrete form of the step size. While it is not required for this example, a redundant form that formally defines the values that h may take is shown in Ref. 4-04. This form may be useful in some inferences:

$$eq(\mod(h, RStep(S\text{-Center5-}KSegs)), 0).$$

But what about the partitioning condition of Center5-KSegs? While this partition has new substructure, it is still equivalent to Center5 and therefore $$\text{Part}estx(\text{Center5-}KSegs) = \text{Part}estx(\text{Center5}).$$

The logical specification of the Aslice loop constraint (Ref. 4-03) is a bit more complex because the lower and upper bounds of the range of i will change. It will have to start at the current value of h and step by 1 though the smaller of (h+rowcount−1) or (m−1). In other words, the last segment may be less than a full rowcount of rows. Note that the expression uses the less than operator ("<") rather than use the less than or equal operator ("<="), which would require a redundant minus one operation in both arguments of the min operation.

The partitioning condition of Center5-ASeg is the partitioning condition of Center5 (i.e., Partestx(S-Center5)) logically And-ed with the new lower and upper bounds of i in the ASlice loop constraint.

Figure 11:
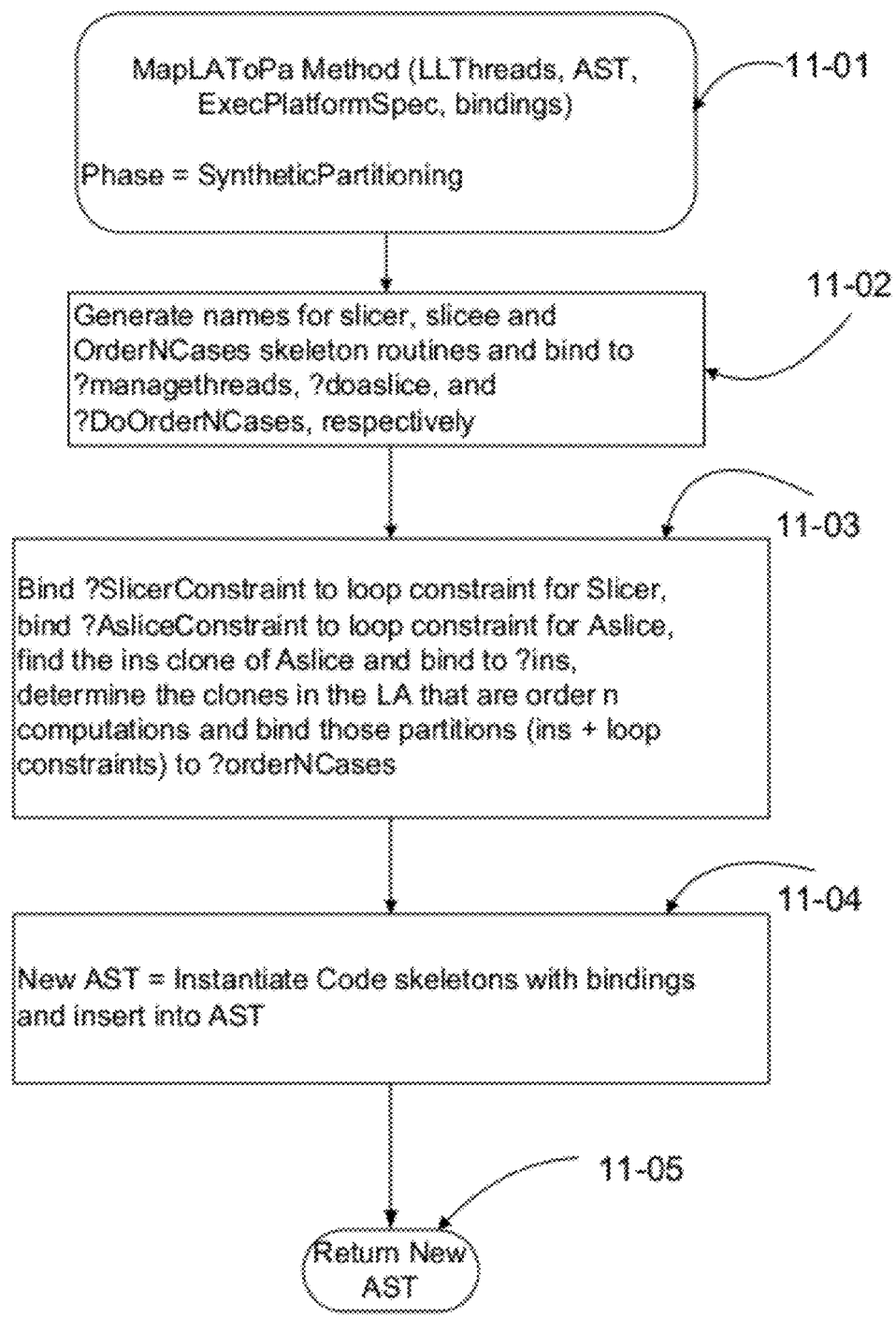
FIG. 11: Method of LLThreads framework that instantiates code skeletons from logical architecture

In the LA of FIG. 4, ASlice loop constraint is nested in Slicer thereby determining which "h" is being referenced in ASlice. But as the LA is refined and evolved toward a programming language representation, that implication will have to be converted to the rules of programming languages and re-expressed unambiguously in that context. The framework associated with these two synthetic partitions expects a new variable to play this new role and it is constructed with slots that expect that variable name. Making the connection between that expectation and some concrete variable in the LA is the job of the method of that framework (FIG. 11). In fact, all that the method has to do is identify the constraint in the LA that plays the role of the slicer and bind it to ?SlicerConstraint, which is a name in an expression in the framework. When the instantiation with expression simplification is done, a pointer to "h" appears in a call to a routine that will process a slice as well as a parameter in the definition of that expression. The computational payload for the do a slice routine contains the loop constraint for a slice, which will eventually be expanded into the correct loop to handle a slice.

Figure 5:
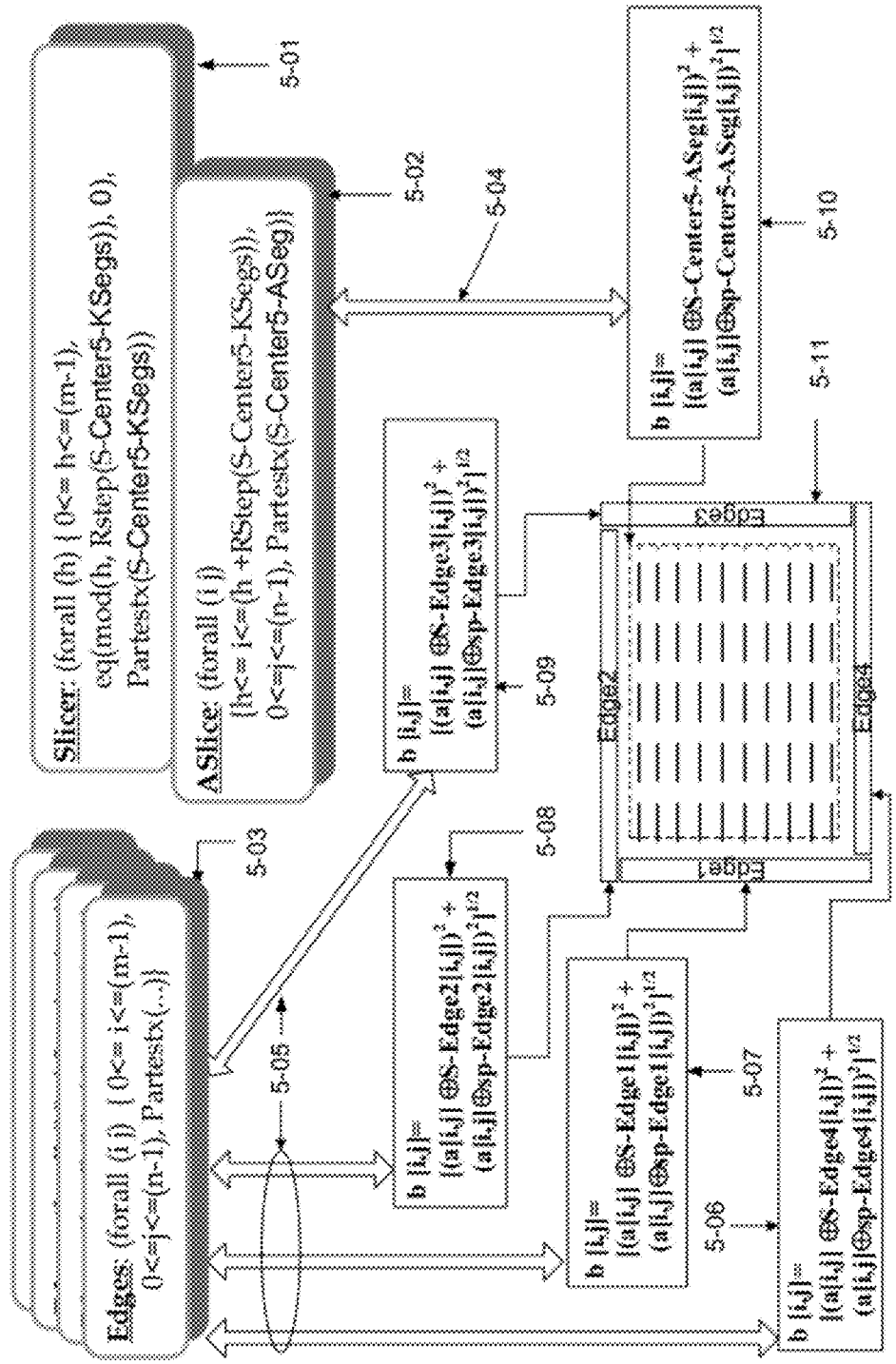

The next step is cloning and specialization of the INS expression (Ref. 4-02) and its loop constraint for each partition, which will result in an LA with specialized loop constraints and specialized INS for each explicit partition. FIG. 5 illustrates this new form. In the preferred embodiment, generating the elements of FIG. 5 is integral to the step that instantiates the framework routines. Thus, FIG. 5 just an implied form that never exists as a separate, concrete entity. But for description purposes, it is clearer to describe the formulation of the FIG. 5 architecture as a separate step. The cloning and specialization of the INS and the loop constraints within the context of the implied logical architecture of FIG. 5 is pretty simple. The INS expression (Ref. 4-02) is copied and the substitutions (e.g., Ref. 3-06) of the partition (e.g., Edge1) are applied with the result being Ref. 5-07 for the Ref. 3-06 example. That is, applying substitution ((s. s-edge1) (sp. sp-edge1)) to $$b[i,j] = [(a[i,j] \oplus s[i,j])^2 + (a[i,j] \oplus sp[i,j])^2]^{1/2}$$

will produce the expression specialized to Edge1:

$$b[i,j] = [(a[i,j] \oplus S\text{-}Edge1[ij])^2 + (a[i,j] \oplus sp\text{-}Edge1[i,j])^2]^{1/2}$$

which will be associated with the specialize loop constraint for Edge1:

$$(\text{forall}(ij)\{0<=i<=(m-1), 0<=j<=(n-1), \text{Part}estx(S\text{-}Edge1)\}.$$

Later, when the definitions of the operators and methods are eventually inlined, they will produce code specialized for the specific partitions. For example, for the Edge1 partition, Partestx(S-Edge1) will refine into "(=i 0)". Further, the expression $$(a[i,j] \oplus S\text{-}Edge1[ij])^2$$

will refine through a series of inlining steps and partial evaluation steps as follows starting with inlining the definition of the convolution, which is expressed in terms of Method-Transform (MT) IL definitions for the S-Edge1 design object. These lower level MT's define how to compute the row and column indexes when positioned at pixel [i,j] in the image matrix and the [p,q] relative position in the pixel neighborhood as well as how to compute the convolution coefficients (or weights) for the pixel neighborhood:

```
(* (aref a (row s-Edge1 a[i,j] p q)
         (col s-Edge1 a[i,j] p q) )
   (w s-Edge1 a[i,j] p q))² .
```

Inlining the MT definitions for row, col and w (Ref. 1c-01) results in:

```
(* (aref a (+ 0 (– p 1))
           (+ j (+q 1)))
    0))² .
```

Partial evaluation of this expression produces

```
(* (aref a (– p 1)
           (+ j (+q 1)))
    0))²
```

Which further reduces to $$(0)^2$$

and then to

0.

The expression of SP-Edge1 goes through an analogous reduction also resulting in 0. And the square root of (0+0) then reduces to 0 giving the final specialization of the INS for edge1 as:

$$b[i,j] = 0$$

Partial evaluation of the loop constraint under the additional assertion "(=i 0)" will invoke the inference system, which determines that the loop over i will evaporate with 0 substituted for i everywhere in the INS expression, reducing the final form of this case to $$(\text{forall}(j)\{0<=i<=(m-1), 0<=j<=(n-1), (i==0)\}b[0,j] = 0).$$

Later in the generation process, this expression will refine to C code of the form:

for(j=0; j<=(n-1); ++j)b[0,j]=0;

Notice that only the Partestx(S-Edge1) IL is included in the loop constraint even though there were two separate partitions (i.e., Edge1 and Edge6) induced by the two separate expressions involving design variables S and SP. This is because the partitioning conditions for the partition (i.e., Edge1) generated while translating the portion of the INS expression containing S will be the same as the partitioning condition for the partition (i.e., Edge6) generated while processing the sub-expression containing SP. The partitions Edge1 and Edge6 were identified as logically equivalent earlier in the processing and were combined. The operational effect of this combination is that the loop for the S sub-expression and the loop for the SP sub-expression are combined into a single loop in the final result.

However, the previous explanation skipped ahead a bit and omitted some steps in order to simplify the explanation of the inlining and partial evaluation processes. It also allowed us to provide a set of code-level, concrete pieces as contextual anchor points to more clearly fix the computational payload contributions of the LA and tie them together with the infrastructure parts supplied by the synthetic objects and their frameworks. What was omitted was the description of mapping the logical architecture of FIG. 5 to the physical architecture wherein we begin to map in implementation design patterns, where the design patterns include programming language domain coding infrastructure and details such as routine structure and relationships, patterns of thread management and control, patterns of synchronization, etc. This will be explained next. It will be accomplished by determining a framework that is compatible with the LA. That framework will be used to incorporate these details and map pieces of the logical architecture into slots in that framework. Notably, this mapping will make special use of the domain specific semantics of the synthetic and natural partitions to figure out what elements of the logical architecture fit where.

Figure 6:
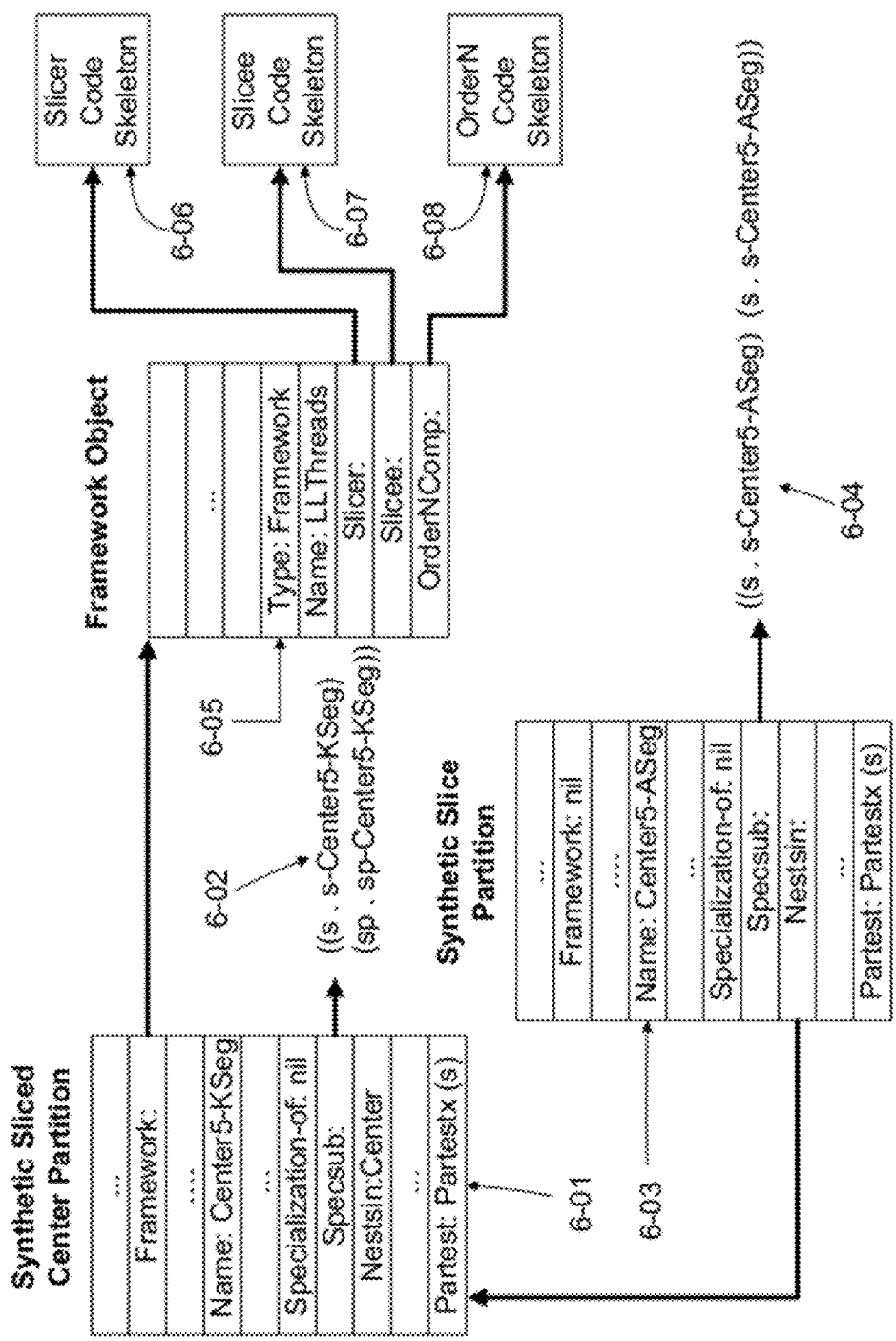
FIG. 6: Synthetic partition objects and their code framework object
Figure 10:
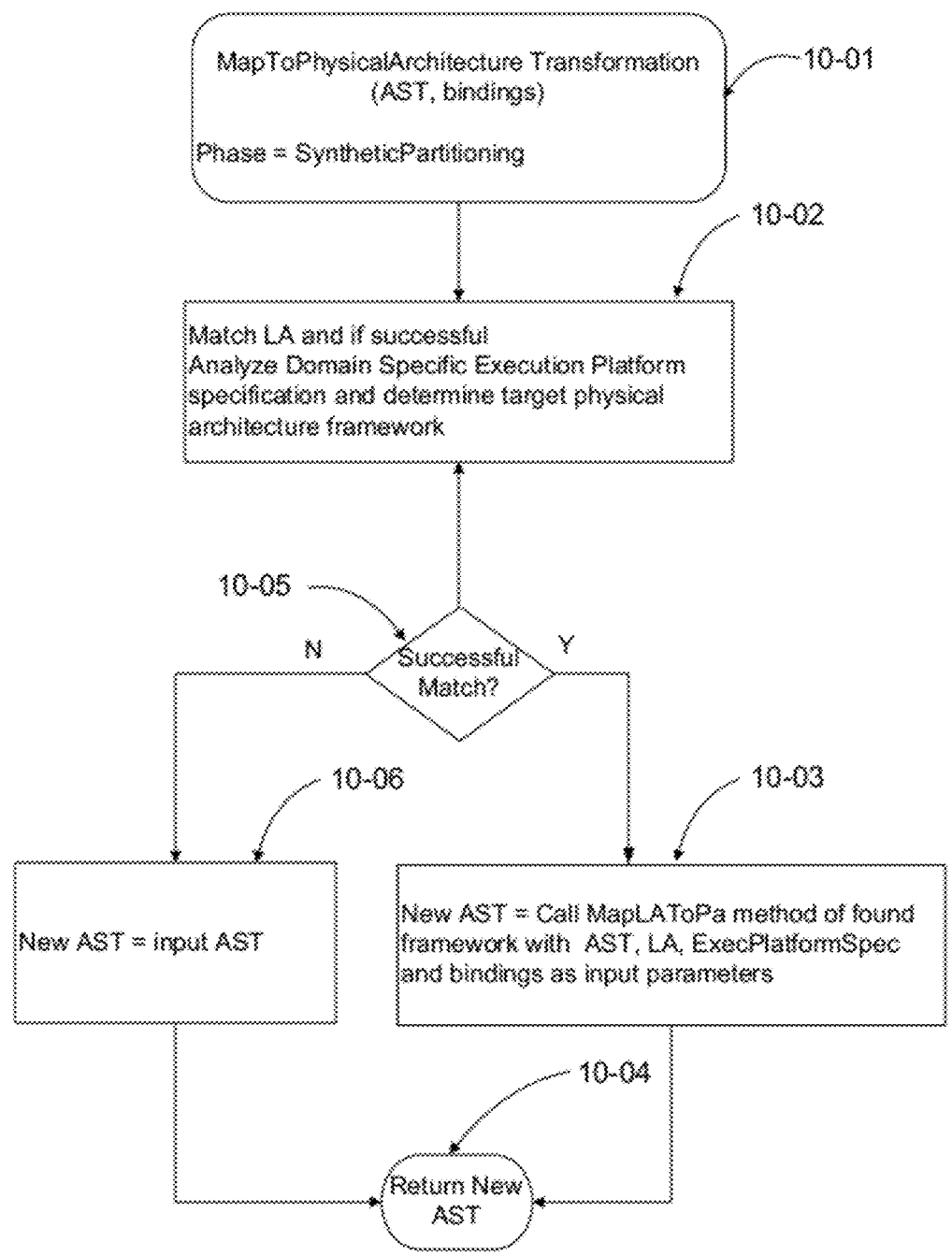
FIG. 10: Transformation to determine applicable code framework for the logical architecture

The MapToPhysicalArchitecture Transformation of FIG. 10 oversees this mapping work. It first analyzes the description of the execution platform to determine the properties the user wants to exploit as well as what elements of the LA participate in this mapping (e.g., the synthetic partitions). Using this knowledge, it selects a framework out of those available and sets it up as the target of the mapping. In this example, it will select the LLTHREADS framework object (Ref. 6-05) whose operational MT is defined in FIG. 11. This framework is represented by an object named LLTRHEADS of type framework (Ref. 6-05 of FIG. 6) which is connected to the synthetic partition object Center5-Kseg (Ref. 4-12). This framework object has three parts—a Slicer routine (i.e., Ref. 6-06), a Slicee routine (i.e., Ref. 6-07) and an OrderN routine (Ref. 6-06). These will be refined into coordinated routines that will create a set of threads that will execute in parallel on a multicore execution platform.

Figure 7:
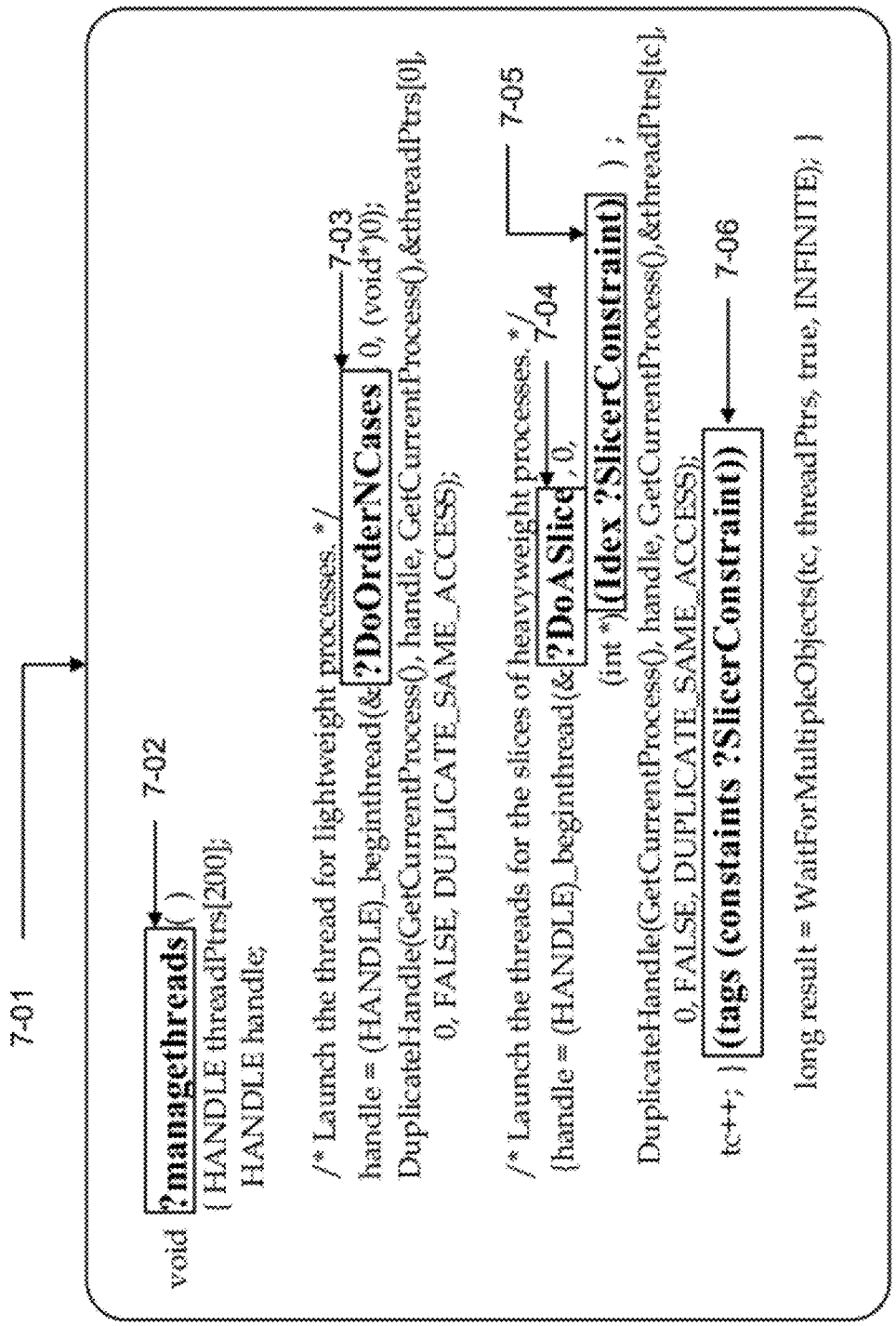
FIG. 7: Code skeleton for slicer routine with domain specific insert points
Figure 8:
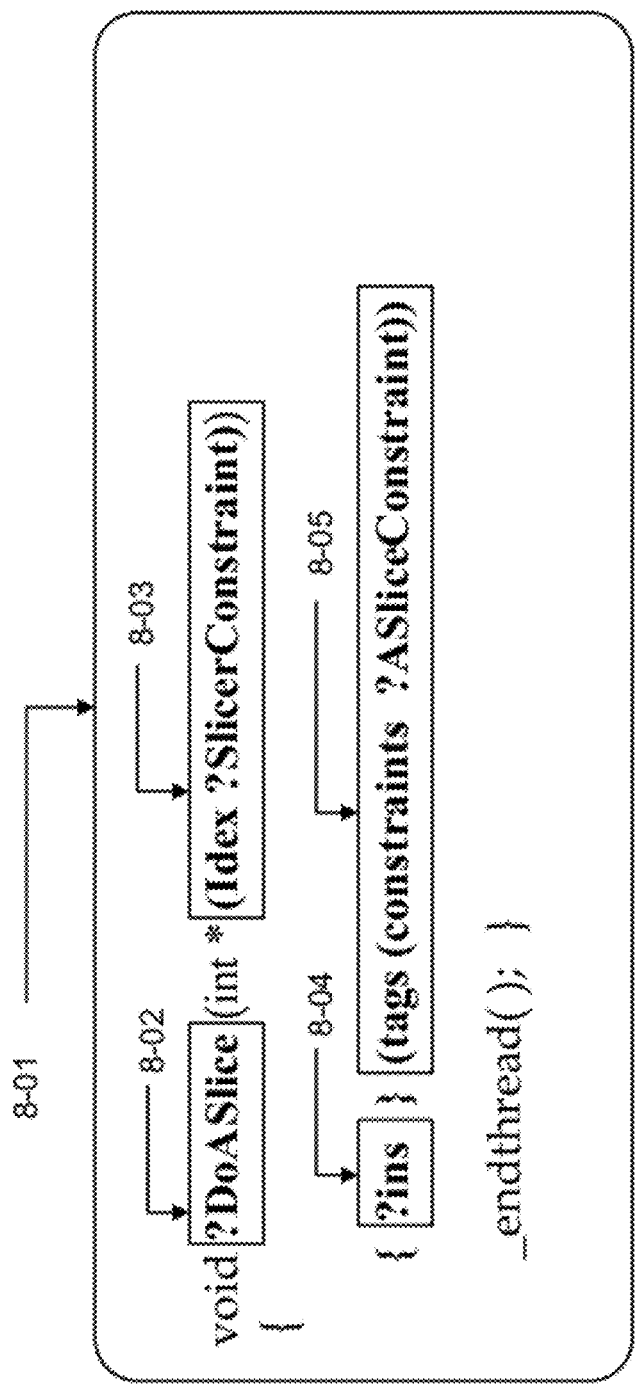
FIG. 8: Code skeleton for slicee routine with domain specific insert points
Figure 9:
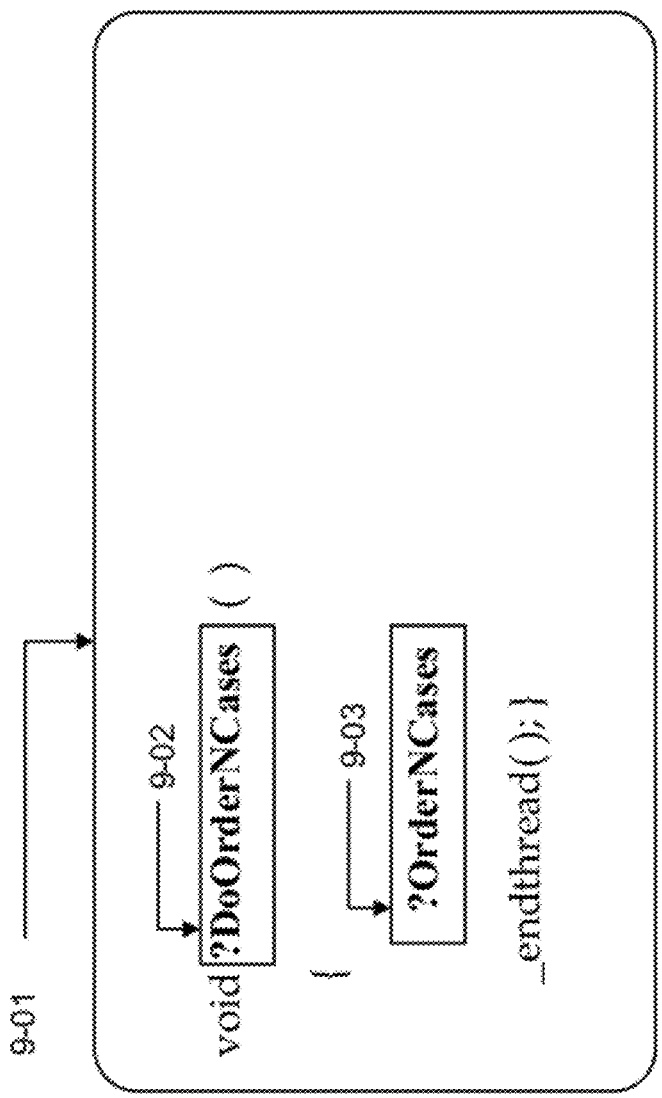
FIG. 9: Code skeleton for DoOrderNCases routine with domain specific insert points

FIGS. 7-9 illustrate the form of these three skeletal routines. These routines are a mixture C code (actually, precursor forms of C code in the preferred embodiment), IL expressions and pattern variables, where the properties of those pattern variables include programming and problem domain semantics that correspond to the is programming and problem domain semantic properties of the synthetic partition objects and related components. For example, the pattern variables ?managethreads (Ref. 7-02), ?DoOrderNCases (Ref. 7-03) and ?DoAslice (Ref. 7-04) have a property that defines them as the routine names for the routines that will be generated from the three elements of the LLTHREADS framework object. The pattern variable ?SlicerConstraint corresponds to the synthetic partition Center5-KSegs (Ref. 4-12) and by implication provides a connection to the associated loop constraint Slicer (Ref. 4-04). The IL expression "(Idex ?SlicerConstraint)" (Ref. 7-05) will refine to the index name of that associated loop constraint (Ref. 4-04), which in this example will be "h". Similarly, the expression "(tags (constraints ?SlicerConstraint))" (Ref. 7-06) will refine to a tag expression to be associated with a block of the framework code and in a later phase, that expression will refine into a loop for slicing up the Center partition and initiating threads for each slice.

FIG. 8 is little more that a shell to receive the INS expression (Ref. 8-04) and a tag expression (Ref. 8-05) containing the associated loop constraint for a slice of the center, where that loop constraint will be Center5-ASeg (Ref. 4-13). Since this is a thread routine that will be initiated and managed by the slicer routine (FIG. 7), it contains a thread synchronization construct that signals when the thread of FIG. 8 has completed.

FIG. 9, is a shell for doing lightweight processes (e.g., matrix edges) sequentially in a single thread. The LLTHREAD transformation uses domain specific heuristic knowledge about the edges in the logical architecture (Refs. 4-05, 4-06, 4-07, 4-09) as represented in their cloned and specialized forms in FIG. 5 (Refs. 5-06 through 5-09) to identify them as candidates for the values of the ?OrderNCases pattern variable (Ref. 9-03). That heuristic knowledge includes the fact that partitions of type "edge" are probably linear computations (i.e., order n computations) and therefore, are unlikely to provide much productivity gain (and maybe even a productivity loss) if each is assigned to its own thread. In the absence of any other more specific instructions from the user in the execution platform description, that logic determines that the edges will be processed sequentially in a single thread. In this example, we assume that the user has provided no specific instructions.

In summary, the MapLAToPa method of LLTHREADS in FIG. 11, binds items from the LA to the pattern variables in the framework components (Ref. 6-06, 6-07 and 6-08) and then instantiates the framework components with these items as a first step.

Follow on phases will handle the further refinement, largely by inlining of the IL definitions and simplifying the results via partial evaluation. FIG. 11 is quite specific to the example design and omits description of the logic that uses problem domain and programming domain semantics to determine how to map the computational payloads from the LA into the appropriate receptacles in the framework components. Since this has been described earlier in the description, it was omitted in the figures in the name of conciseness.

The following paragraphs will describe this refinement process in terms of the examples in FIGS. 7, 8 and 9.

Given assignments for the pattern variables of objects chosen from the logical architecture, the frameworks will refine as follows starting with the slicer routine of FIG. 7:

```
void SobelThreads8 ( )
{ HANDLE threadPtrs[200];
  HANDLE handle;
  /* Launch the thread for lightweight processes. */
  handle = (HANDLE)_beginthread(& SobelEdges9, 0, (void*)0);
  DuplicateHandle(GetCurrentProcess( ), handle,
                  GetCurrentProcess( ),&threadPtrs[0],
                  0, FALSE, DUPLICATE_SAME_ACCESS);
  /* Launch the threads for the slices of heavyweight processes. */
  {handle = (HANDLE)_beginthread(& SobelCenterSlice10, 0, (void*) h);
  DuplicateHandle(GetCurrentProcess( ), handle,
                  GetCurrentProcess( ),&threadPtrs[tc],
                  0, FALSE, DUPLICATE_SAME_ACCESS);
  tc++; } (tags (constaints slicer)))
  long result = WaitForMultipleObjects(tc, threadPtrs, true, INFINITE); }
```

When the loop constraints are processed into C form, this will evolve to:

```
void SobelThreads8 ( )
{ HANDLE threadPtrs[200];
  HANDLE handle;
  /* Launch the thread for lightweight processes. */
  handle = (HANDLE)_beginthread(& SobelEdges9, 0, (void*)0);
  DuplicateHandle(GetCurrentProcess( ), handle,
           GetCurrentProcess( ),&threadPtrs[0],
           0, FALSE, DUPLICATE_SAME_ACCESS);
  /* Launch the threads for the slices of heavyweight processes. */
  for ( int h=0; h<=(m-1);h=h+5)
     {handle = (HANDLE)_beginthread(& SobelCenterSlice10, 0,
     (void*) h);
     DuplicateHandle(GetCurrentProcess( ), handle,
           GetCurrentProcess( ),&threadPtrs[tc],
           0, FALSE, DUPLICATE_SAME_ACCESS);
     tc++; }
  long result = WaitForMultipleObjects(tc, threadPtrs, true,
  INFINITE); }
```

Similarly, the slicee routine evolves as follows:

```
void SobelCenterSlice10 (int *h)
{
{b [i,j]= [(a[i,j] ⊕ s-center5-Aseg[i,j])² +
           (a[i,j] ⊕ sp-center5-ASeg[i,j])²]^{1/2} }
       (tags (constraints Aslice))
_endthread( ); }
Eventually, this evolves into
void SobelCenterSlice10 (int *h)
{
for (int i=h; i<=(h + 4); ++i)
  { for (int j=1; j<=(n-2); ++j)
     {b [i,j]= [(a[i,j] ⊕ s-center5-Aseg[i,j])2 +
           (a[i,j] ⊕ sp-center5-ASeg[i,j])2]1/2 } }
_endthread( ); }
```

Recall that the initial value of the global variable rowcount is 5 and the upper limit from the loop constraint was the expression (h+rowcount−1). Partial evaluation of the upper limit test for the outer loop results in the "i<=(h+4)" expression.

And finally, after a series of inlining step analogous to the Edge1 partition refinement process but without the extensive simplification engendered by the IL definitions for Edge1, this refines into:

```
void SobelCenterSlice10 (int *h)
    {long ANS45; long ANS46;
    /* Center5-KSegs partitioning condition is
        (and (not (i=0)) (not (j=0)) (not (i=(m-1))) (not (j=(n-1)))) */
    /* Center5-ASeg partitioning condition is
        (and (not (i=0)) (not (j=0)) (not (i=(m-1))) (not (j=(n-1))) (h<=i) (i<(h+5))*/
    for (int i=h; i<=(h+ 4); ++i) {
        for (int j=1; j<=(n-2); ++j) {
            ANS45 = 0;
            ANS46 = 0;
            for (int P15=0; P15<=2; ++P15) {
                for (int Q16=0; Q16<=2; ++Q16) {
                    ANS45 +=
                        (((*((*(B + ((i + (P15 +-1)))) + (j + (Q16 +-1))))) *
                            (((((P15 - 1) != 0) && ((Q16 - 1) != 0)) ? (P15 - 1):
                                (((((P15 - 1) != 0) && ((Q16 - 1) == 0)) ? (2 * (P15 - 1)): 0)));
                    ANS46 +=
                        (((*((*(B + ((i + (P15 +-1)))) + (j + (Q16 +-1))))) *
                            (((((P15 - 1) != 0) && ((Q16 - 1) != 0)) ? (Q16 - 1):
                                (((((P15 - 1) == 0) && ((Q16 - 1) != 0)) ? (2 * (Q16 - 1)): 0)));
                }}
        int i1 = ISQRT ((pow ((ANS46),2) + pow ((ANS45),2)));
        i1 = (i1 < 0) ? 0 : ((i1 > 0xFFFF) ? 0xFFFF : i1);
        ((*((*(A + (i))) + j))) = (BWPIXEL) i1; }}
        _endthread( ); }
```

This refinement includes detail steps and mechanisms (e.g., the introduction of the answer variables ANS45 and ANS46) that fall outside the focus of this specific invention but are explained in U.S. Pat. No. 8,060,857. Thus, we will not explain them here. Also, the reader will note that the inlining step has introduced some common sub-expressions (e.g., (P15-1)) which will degrade the overall performance if not removed. If this code is targeted to a good optimizing compiler, these common sub-expressions will be removed by that compiler and thereby the performance improved. However, if the target compiler is not able to perform this task, the preferred embodiment offers the option of having the generator system remove the common sub-expressions and this can be easily added to the specification of the execution platform. The common sub-expressions are explicitly included in the example (i.e., not optimized away) to make the connection to the structures of the MTs used by the INS more obvious to the reader. The broad structure of the right hand operand of the times (*) operator in the right hand side of the assignments to is the answer variables ANS45 and ANS46 is structurally the same as that of the W method transform specialized to the center partition for SP and S. That is, the C form $$(((({*}(({*}(B+((i+(P15+-1))))+(j+(Q16+-1)))))*((((P15-1)!=0)\&\&((Q16-1)!=0))?(Q16-1):(((((P15-1)==0)\&\&((Q16-1)!=0))?(2*(Q16-1)):0)));$$

mimics the form of the MT definition for w of S-Center5 (Ref. 1c-02) because it is derived by inlining that MT definition and eventually processing it into legal C. The definition of w of S-Center5 has the form

```
(if (and (!= ?p 0) (!= ?q 0))
    (then ?q)
    (else (if (and (if (and (== ?p 0) (!= ?q 0)))
        (then (* 2 ?q))
        (else 0)).
```

When the inlining occurs for the S-Center5 generator design variable, ?p is bound to "(P15-1)" and ?q is bound to "(Q16-1)". The "-1" part of these values arise because of a C indexing design feature encapsulated earlier in the generation process. That design feature maps the domain language indexing system for neighborhoods (i.e., [−n, +n]) to a C language style of indexing (i.e., [0, 2n+1]).

MT's are discussed in greater detail in the U.S. Pat. No. 8,060,857.

The ?DoOrderNCases routine evolves in a similar manner. The initial instantiation will produce the following form:

```
void Sobel Edges9( )
    {
        {b [i,j]= [(a[i,j] ⊕ s-edge1[i,j])2 + (a[i,j] ⊕ sp-edge1[i,j])2]1/2}
            (tags (constraints LoopConstraintEdge1))
        {b [i,j]= [(a[i,j] ⊕ s-edge2[i,j])2 + (a[i,j] ⊕ sp-edge2[i,j])2]1/2}
            (tags (constraints LoopConstraintEdge2))
        {b [i,j]= [(a[i,j] ⊕ s-edge3[i,j])2 + (a[i,j] ⊕ sp-edge3[i,j])2]1/2}
            (tags (constraints LoopConstraintEdge3))
        {b [i,j]= [(a[i,j] ⊕ s-edge4[i,j])2 + (a[i,j] ⊕ sp-edge4[i,j])2]1/2}
            (tags (constraints LoopConstraintEdge4))
        _endthread( ); }
```

Next, the loop constraints are processed into an intermediate AST loop form (not shown) that is still "logical" in the sense that the loop control is expressed as a set of logical assertions. Then those logical loops forms are then used to infer the concrete C forms. Note that the preferred embodiment generates C comments that contain the refinement of Partestx(Edge1), etc. for each partition. This is information that the domain engineer can use for debugging the generator.

```
void Sobel Edges9( )
    { /* Edge1 partitioning condition is (i=0) */
        {for (int j=0; j<=(n-1);++j)
            b [0,j]= [(a[0,j] ⊕ s-edge1[0,j])2 + (a[0,j] ⊕
                sp-edge1[0,j])2]1/2}
    /* Edge2 partitioning condition is (j=0) */
        {for (int i=0; i<=(m-1);++i)
            b [i,0]= [(a[i,0] ⊕ s-edge2[i,0])2 + (a[i,0] ⊕
                sp-edge2[i,0])2]1/2}
    /* Edge3 partitioning condition is (i=(m-1)) */
        {for (int j=0; j<=(n-1);++j)
            b [(m-1),j]= [(a[(m-1),j] ⊕ s-edge3[(m-1),j])2 +
                (a[(m-1),j] ⊕ sp-edge3[(m-1),j])2]1/2}
    /* Edge4 partitioning condition is (i=(n-1)) */
        {for (int i=0; i<=(m-1);++i)
```

```
        b [i, (n−1)]= [(a[i, (n−1)] ⊕ s-edge4[i, (n−1)])2 +
            (a[i, (n−1)] ⊕ sp-edge4[i, (n−1)])2]1/2}
_endthread( ); }
```

Inlining and simplification via partial evaluation proceeds much the same as with the previous cases eventually producing the following form:

```
void Sobel Edges9( )
    {
        /* Edge1 partitioning condition is (i=0) */
        {for (int j=0; j<=(n−1);++j) b [0,j]= 0;}
        /* Edge2 partitioning condition is (j=0) */
        {for (int i=0; i<=(m−1);++i) b [i,0]= 0;}
        /* Edge3 partitioning condition is (i=(m−1)) */
        {for (int j=0; j<=(n−1);++j) b [(m−1),j]= 0;}
        /* Edge4 partitioning condition is (i=(n−1)) */
        {for (int i=0; i<=(m−1);++i) b [i, (n−1)]= 0;}
_endthread( ); }
```

Some processing steps describe in the earlier patent application or that are obvious have been omitted for conciseness. For example, one of the final phases of processing will create declarations and insert them into their correct location in the skeletal framework routines and elsewhere (e.g., in the scopes hosting the skeletal routines). The declarations that are specific to the LA arise through the processing the INS. Of course, they will accompany elements of the LA into the skeletal framework routines and therefore, will be available for this late phase processing that inserts the declarations where the programming language compiler (e.g., the C compiler) expects them.

Other processing (not shown) includes the transformations that move the skeletal routine definitions into host locations within the overall AST to make them acceptable to the C compiler.

SEQUENCE LISTING

Not Applicable

What is claimed is:

1. A method of using synthetic partitioning constraints to automatically impose a programming language level implementation infrastructure onto a logical architecture of a desired computation wherein each step of said method uses a computer, the method comprising:

using a domain specific specification of a desired execution platform as input to said method;
    wherein said specification of a desired execution platform implies desired design features for an implementation form of said desired computation;
using a logical architecture of said desired computation as input to said method;
    wherein said desired computation is expressed as an implementation neutral computational specification;
    wherein said desired computation is associated with said logical architecture;
    wherein said logical architecture is a partial and provisional specification of at least some design features of said desired computation;
    wherein said logical architecture includes constraint objects and associated parts of said constraint objects within an implementation neutral, domain specific specification of said desired computation;
    wherein said constraint objects limit a legitimate set of possible implementation forms to one or more eventual programming language expressions of said desired computation that are consistent with said constraint objects and their associated parts;
    wherein said constraint objects may be, among other things, partitioning constraint objects, which represent implied partitions of computer code that exploits high capability features of the desired execution platform such that said implied partitions derived from said constraint objects are logically consistent with a set of logical assertions and abstract precursors to said logical assertions that are part of one or more definitions of said constraint objects;
    wherein said constraint objects may represent, among other things, implied iteration objects such that one or more eventual programming language expressions derived from said implied iteration objects are logically consistent with a set of logical assertions and abstract precursors to said logical assertions that are part of one or more definitions of said implied iteration objects; and
    wherein a decomposition of said desired computation into separate pieces of an overall computation can be automatically inferred from a partitioning constraint object;
creating synthetic partitioning constraints that extend said partitioning constraint objects by requiring that said logical architecture or elements thereof be integrated and coordinated with a program language level framework,
    wherein said framework includes, a) said desired design features for an implementation of said desired computation, b) a set of interrelated skeletal programming language level routines, their control structure and any global data required by said framework thereby introducing some code level infrastructure to support a target computation without specifying what said target computation will compute, and c) a set of methods for producing an integration of said logical architecture and said framework in a fully coordinated, correct and consistent manner;
    wherein said logical architecture provides computational elements of said target computation;
    wherein execution of said integration will produce correct results for said desired computation and will exploit said desired design features implied by said domain specific specification of said desired execution platform;
applying said synthetic partitioning constraints to manufacture a programming level implementation form that correctly integrates said desired computation with said framework such that executions of said programming level implementation will accomplish said desired computation.

2. A method of claim 1 for creating and manipulating logical architectures that express the intent of a computation but defer commitment to a plurality of programming language design structures and details,
    wherein said programming language design structures and details that are deferred include but are not limited to routines, functions, threads, control structures, variable scopes, parametric connections, data flow connections, machine units, instruction styles, and parallel synchronization structures, the method comprising:

building a logical architecture from representational forms that preclude machinery for expressing programming language constructs or precursors thereof or abstractions thereof;

wherein said representational forms include but are not limited to functional expressions of domain specific operators and operands; and constraints that are partial, provisional and logical descriptions of iterations and partitionings of said iterations;

wherein said representational forms include domain specific properties that exist outside of the programming language domain and that provide heuristic knowledge outside of said programming language domain by which said representational forms may be manipulated, combined and evolved;

providing a method for representing associations of said representational forms, where said associations imply future derivations in which one or both associated forms may affect the derivation one or both of said associated forms; and providing rules whereby representational forms may be propagated, combined, reorganized, restructured and enriched with additional representational forms in ways that imply that future derivations of programming language constructs from modified forms and combinations thereof will change as a result of modification without directly and immediately manufacturing said derivations of programming language constructs.

3. A method of claim 1 for using synthetic partitioning constraints to restructure a logical architecture of a desired computation to be structurally, logically and conceptually consistent with target framework infrastructures and thereby promote easy and correct integration of said logical architecture with said target framework infrastructures, the method comprising:

providing a plurality of candidate logical architecture reorganization strategies, wherein said strategies include but are not limited to splitting or combining iteration and partitioning constraints, introducing new iteration and partitioning constraints, specializing constraints and implementation neutral computation specifications, regrouping partitions based on their heuristic and problem domain conceptual properties, applying constraints to factor and specialize associations of implementation neutral computation specifications and constraints, and a plurality of other methods;

providing one or more object oriented methods of said synthetic partitioning constraints that analyze said logical architecture, a specification of a target execution platform and candidate target framework infrastructures implied by said synthetic partitioning constraints to determine a plurality of reorganization strategies that allow mapping said logical architecture into said target framework infrastructures.

4. A method of claim 1 for using domain specific heuristic knowledge and rules to aid in the choice of a framework that is consistent with some synthetic partition constraint, wherein said domain specific heuristic knowledge and rules include but are not limited to using properties of logical architecture elements, properties of associative programming constraints, design features implemented by said framework, operational properties of said framework, computational intent of said framework and structural features of said logical architecture, wherein said logical architecture includes associative programming constraint objects and their associated parts within an implementation neutral, domain specific specification of said desired computation;

wherein said constraint objects limit a legitimate set of possible forms of one or more eventual programming language expressions of said constraint objects and their associated parts resulting in the generation of the compilable and executable high capability implementation form of a computation;

wherein said constraint objects may represent, among other things, implied iteration objects such that the one or more eventual programming language expressions derived from said implied iteration objects are logically consistent with a set of logical assertions and abstract precursors to said logical assertions that are part of a definition of said implied iteration objects;

wherein said constraint objects may represent, among other things, implied partitions of said computer code that exploits high capability features of the desired execution platform such that said implied partitions are logically consistent with a set of logical assertions and abstract precursors to said logical assertions that are part of one or more definitions of said constraint objects; and wherein said logical assertions and abstract precursors to said logical assertions of a constraint object that implies a partition are called partitioning conditions for said constraint object that implies a partition, the method comprising:

determining domain specific and heuristic properties of said logical architecture and of said skeletal programming language level routines of a candidate framework; and using said domain specific and heuristic properties of said logical architecture and of said skeletal programming language level routines in conjunction with said desired execution platform, to determine applicability of using said candidate framework to implement said logical architecture.

5. A method of claim 1 for using domain specific heuristic knowledge and rules to aid in mapping elements of a logical architecture into skeletal programming language level routines of a framework, the method comprising:

determining domain specific and heuristic properties of said logical architecture and of said skeletal programming language level routines;

using domain specific and heuristic properties of said logical architecture to select elements of said logical architecture that correspond to domain specific and heuristic requirements of holes within said interrelated skeletal programming language level routines of said framework; and instantiating said interrelated skeletal programming language level routines of said framework by substituting said elements of said logical architecture for said holes and by adding said global data required by said framework to a scope of said programming level implementation that will host said interrelated skeletal programming language level routines.

6. A method of claim 1 for logical decomposition and cloning of a loop constraint and said loop constraint's associated implementation neutral specification of a computation or part thereof into logical architectural elements based on a partition set associated with said loop constraint, where said architectural elements are candidates for mapping into holes within an implementation framework, the method comprising:

copying said loop constraint and its associated implementation neutral specification of a computation, where said loop constraint is modified by one of more partition constraints;

specializing a loop constraint by adding a partitioning condition from one of said partitioning constraints to said loop constraint; and further specializing a loop constraint and its implementation neutral specification of a computation or part thereof by applying said partitioning constraint's substitution list to said loop constraint and said loop constraint's associated implementation neutral specification of a computation or part thereof.

7. A method of claim 1 for revising a candidate implementation framework associated with one or more synthetic partitions such that the behavior of said candidate is varied to fulfill additional requirements, wherein said candidate initially fulfills many but not all requirements of a domain specific computation specification and an associated execution platform specification, the method comprising:

determining that said candidate may potentially be revised to fulfill all behaviors required by said requirements;

determining a set of transforms that can extend said framework's set of currently satisfied requirements to fulfill all requirements; and applying high order transformations to rewrite and restructure elements of a framework to incorporate a behavioral or structural variation based on requirements provided by a logical architecture of a computation and a domain specific specification of a target execution platform.

8. A method of claim 1 for changing programming process intentions, wherein said intentions are manifested by elements of a logical and physical architectures, including but not limited to associative programming constraints and intermediate language definitions of domain specific operators and operands; and wherein said logical and physical architectures and elements thereof represent unrealized programming process intentions, the method comprising:

providing rules for manipulating, propagating, combining, decomposing, revising, restructuring and extending said elements of a logical architecture thereby defining changes in said programming process intentions;

applying said rules to alter said intentions thereby effecting a change in said programming process intentions.

9. A method of claim 8 for incremental addition of design features to a logical or physical architecture thereby evolving said logical or physical architecture incrementally toward a final physical architecture, wherein said final physical architecture has structure and elements that directly map into a programming language implementation by simply adding textual surface syntax of said programming language implementation, the method comprising:

defining a design feature in terms of rules that effect changes to a set of programming process intentions; and adding a design feature by applying said rules to said logical or physical architecture.

* * * * *